(12) United States Patent
Li

(10) Patent No.: US 12,160,765 B2
(45) Date of Patent: Dec. 3, 2024

(54) METHOD AND DEVICE FOR DETERMINING BEAM FAILURE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 434 days.

(21) Appl. No.: 17/601,850

(22) PCT Filed: Apr. 10, 2019

(86) PCT No.: PCT/CN2019/082131
§ 371 (c)(1),
(2) Date: Oct. 6, 2021

(87) PCT Pub. No.: WO2020/206641
PCT Pub. Date: Oct. 15, 2020

(65) Prior Publication Data
US 2022/0167197 A1    May 26, 2022

(51) Int. Cl.
*H04W 24/10* (2009.01)
*H04W 74/0833* (2024.01)

(52) U.S. Cl.
CPC ....... *H04W 24/10* (2013.01); *H04W 74/0833* (2013.01)

(58) Field of Classification Search
CPC .......................... H04W 24/10; H04W 74/0833
See application file for complete search history.

(56) References Cited

U.S. PATENT DOCUMENTS

| 11,743,964 B2* | 8/2023 | Ahn | H04W 74/006 370/216 |
| --- | --- | --- | --- |
| 2017/0366236 A1* | 12/2017 | Ryoo | H04B 7/0617 |
| 2018/0279284 A1* | 9/2018 | Wang | H04W 24/10 |
| 2019/0081753 A1* | 3/2019 | Jung | H04L 1/1854 |
| 2020/0196383 A1* | 6/2020 | Tsai | H04L 1/1614 |
| 2020/0267712 A1* | 8/2020 | Cirik | H04W 72/23 |

FOREIGN PATENT DOCUMENTS

WO    WO 2013015725 A1    1/2013

OTHER PUBLICATIONS

European Patent Application No. 19923871.8, Search and Opinion dated Oct. 21, 2022, 16 pages.

(Continued)

*Primary Examiner* — Brenda H Pham
(74) *Attorney, Agent, or Firm* — Cozen O'Connor

(57) ABSTRACT

A method for determining an antenna beam failure includes: establishing, according to received first configuration information, an association relationship between n reference signal sets and n antenna panels, in which the i-th reference signal set is associated with the i-th antenna panel; detecting all reference signals in at least one of the n reference signal sets to determine whether a failed antenna panel having a beam failure exists in at least one antenna panel associated with the at least one reference signal set; and sending to a base station beam failure information indicating that the failed antenna panel has a beam failure in response to determining that the failed antenna panel exists.

18 Claims, 16 Drawing Sheets establishing an association relationship between n reference signal sets and the n antenna panels based on received first configuration information, in which an ith reference signal set is associated with an ith antenna panel, where i ≤ n — S1 detecting all reference signals in at least one reference signal set of the n reference signal sets to determine whether a failed antenna panel with a beam failure exists in at least one antenna panel associated with the at least one reference signal set — S2 sending beam failure information indicating that a beam failure occurs in the failed antenna panel to a base station in response to determining that the failed antenna panel exists — S3

(56) References Cited

OTHER PUBLICATIONS

Qualcomm "Enhancements on multi-beam operation" 3GPP TSG-RAN WG1 Meeting #96-bis, R1-1905027, Apr. 2019, 26 pages.
ZTE "Enhancements on multi-beam operation" 3GPP TSG-RAN WG1 Meeting # 96bis, R1-1904014, Apr. 2019, 17 pages.
Vivo "Discussion on multi-beam operation" 3GPP TSG-RAN WG1 Meeting 1901, R1-1900138, Jan. 2019—10 pages.
PCT/CN2019/082131 English translation of the International Search Report dated Jan. 2, 2020, 2 pages.

* cited by examiner

METHOD AND DEVICE FOR DETERMINING BEAM FAILURE

CROSS-REFERENCE TO RELATED APPLICATION

The present application is a national stage of International Application No. PCT/CN2019/082131, filed on Apr. 10, 2019, the content of which is hereby incorporated by reference in its entirety.

TECHNICAL FIELD

The disclosure relates to a field of communication technology, in particular to a method for determining an antenna beam failure, an electronic device and a non-transitory computer-readable storage medium.

BACKGROUND

In related art, when an antenna beam failure occurs in a user device, the user device may send beam failure information to a base station, such that the base station may determine that the user device encounters a beam failure. However, typically the user device includes multiple antenna panels. In some situations, it is possible that only some of the antenna panels encounter the beam failure, however the base station is not able to determine which antenna panel in the user device encounters the beam failure based on the existing beam failure information.

SUMMARY

Accordingly, the disclosure provides a method for determining a beam failure, an electronic device and a non-transitory computer-readable storage medium, to solve problems in the related art.

According to a first aspect of the disclosure, a method for determining a beam failure is provided. The method is applicable to a user device. The user device includes n antenna panels. The method includes establishing an association relationship between n reference signal sets and the n antenna panels based on received first configuration information, in which an i-th reference signal set is associated with an i-th antenna panel, where i≤n; detecting all reference signals in at least one reference signal set of the n reference signal sets to determine whether a failed antenna panel with a beam failure exists in at least one antenna panel associated with the at least one reference signal set; and sending beam failure information indicating that a beam failure occurs in the failed antenna panel to a base station in response to determining that the failed antenna panel exists.

According to a second aspect of the disclosure, an electronic device is provided. The electronic device includes: a processor and a memory for storing instructions executable by the processor. The processor is configured to perform the method according to any of the above embodiments.

According to a third aspect of the disclosure, a non-transitory computer-readable storage medium having computer programs stored thereon is provided. When the computer programs are executed by a processor, the method according to any of the above embodiments is performed.

BRIEF DESCRIPTION OF THE DRAWINGS

To illustrate the solutions according to the embodiments of the present disclosure or in the prior art more clearly, accompanying drawings needed for describing the embodiments or the prior art are briefly introduced below. Obviously, the accompanying drawings in the following descriptions are merely some embodiments of the present disclosure, and persons of ordinary skill in the art may obtain other drawings according to the accompanying drawings without making creative efforts.

DETAILED DESCRIPTION

The solutions of the embodiments of the present disclosure are clearly and completely described below with reference to the accompanying drawings in the embodiments of the present disclosure. Obviously, the described embodiments are merely part of rather than all of the embodiments of the present disclosure. All other embodiments obtained by persons of ordinary skill in the art based on the embodiments of the present disclosure without making creative efforts shall fall within the protection scope of the present disclosure.

The following description refers to the accompanying drawings in which the same numbers in different drawings represent the same or similar elements unless otherwise represented.

Figure 1:
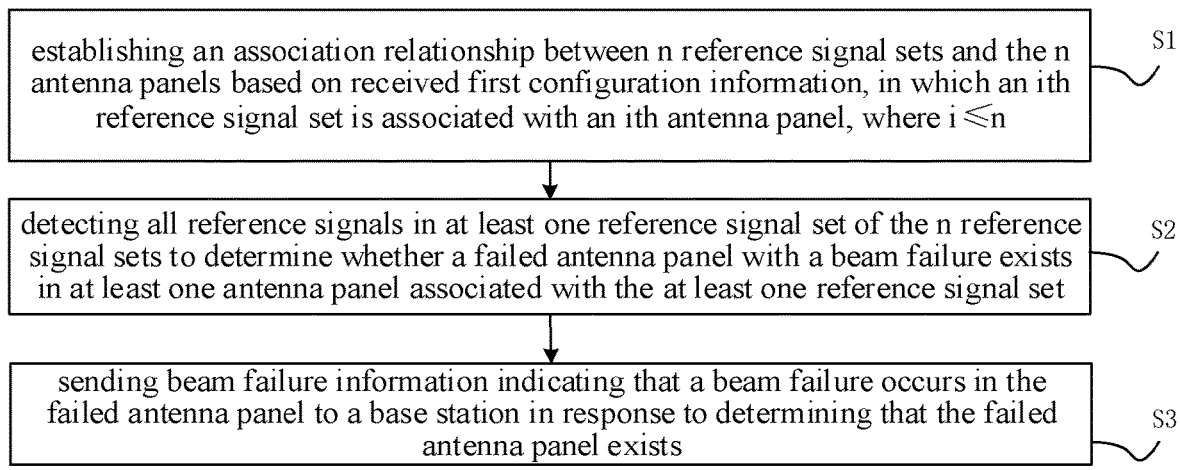
FIG. 1 is a flowchart of a method for determining a beam failure according to an embodiment of the disclosure.

FIG. 1 is a flowchart of a method for determining a beam failure according to an embodiment of the disclosure. The method according to the embodiment may be applied to a user device. The user device may be a phone, a tablet, a wearable device, a vehicle-mounted device or other electronic devices. The user device may communicate with a base station, for example, communicate with the base station based on 4G or 5G.

The user device includes n antenna panels, where n is an integer greater than or equal to 1. Each antenna panel may emit beams in multiple directions, and each antenna panel may emit a beam in one direction at any one moment.

As illustrated in FIG. 1, the method may include the following actions.

In S1, an association relationship between n reference signal sets and then antenna panels is established based on received first configuration information. An i-th reference signal set is associated with an i-th antenna panel, where i≤n. That is, each reference signal in the i-th reference signal set is associated with the i-th antenna panel.

In an embodiment, the base station may send the first configuration information to the user device via a radio resource control (RRC) message.

It should be noted that, in a case that the user device does not receive the first configuration information, the association relationship between the reference signal sets and the antenna panels can be established. For example, if the user device receives a physical downlink control channel (PDCCH) sent by the base station through the i-th antenna panel, a reference signal of a beam on which the PDCCH is located can be determined by the user device as a reference signal in the i-th associated reference signal set.

In an embodiment, one reference signal set may contain one reference signal or may contain multiple reference signals.

In S2, all reference signals in at least one reference signal set of the n reference signal sets are detected to determine whether a failed antenna panel with a beam failure (BF) exists in at least one antenna panel associated with the at least one reference signal set.

In an embodiment, for the i-th antenna panel, it may emit beams in multiple directions to communicate with the base station. But generally, the base station may only configure the i-th antenna panel to use partial beams of all the beams that it can emit in multiple directions for communication, and the remaining unused beams may contain candidate beams (which will be described below).

The reference signal in the i-th reference signal set associated with the i-th antenna panel is used to determine a communication quality of a beam used by the i-th antenna panel to communicate with the base station. If the signal quality of each reference signal in the i-th reference signal set is less than a first quality threshold, it can be determined that a communication between the i-th antenna panel and the base station through the beam corresponding to each reference signal in the i-th reference signal set has a poor communication quality, such that it can be determined that the beam failure occurs in the i-th antenna panel.

For n reference signal sets, all the reference signals in at least one reference signal set can be monitored, and the antenna panel associated with the reference signal set in which a signal quality of each reference signal is less that the first quality threshold can be determined encounters a beam failure.

In S3, in response to determining that the failed antenna panel exists, beam failure information indicating that a beam failure occurs in the failed antenna panel is sent to the base station.

The base station may perform beam failure recovery after receiving the beam failure information.

According to the embodiment of the disclosure, the user device may establish the association relationship between the reference signal sets and the antenna panels based on the first configuration information, may determine the failed antenna panel with a beam failure based on the reference signal set, and may send the beam failure information to the base station to point out which antenna panel encounters the beam failure, such that the base station may accurately determine the failed antenna panel with the beam failure in the user device, thus facilitating schedule of resources.

Figure 2:
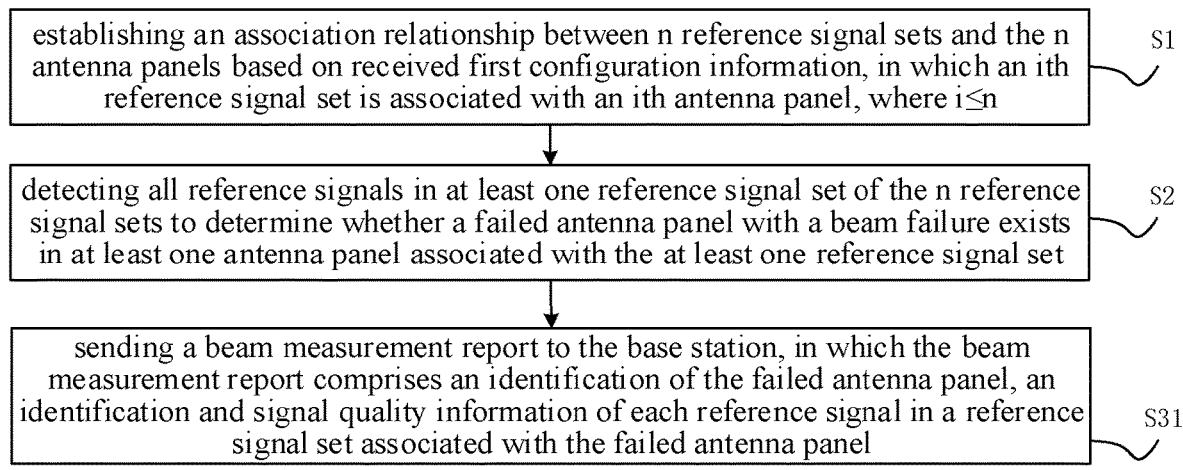
FIG. 2 is a flowchart of another method for determining a beam failure according to an embodiment of the disclosure.

FIG. 2 is a flowchart of a method for determining a beam failure according to an embodiment of the disclosure. As illustrated in FIG. 2, a process of sending the beam failure information indicating that a beam failure occurs in the failed antenna panel to the base station may include the following.

In S31, a beam measurement report is sent to the base station. The beam measurement report includes an identification of the failed antenna panel, and an identification and signal quality information of each reference signal in the reference signal set associated with the failed antenna panel.

The signal quality information includes but is not limited to L1 (layer 1, i.e., a physical layer)_RSRP (reference signal receiving power) and L1_SINR (signal to interference plus noise ratio) and so on.

In an embodiment, the beam measurement report may be sent to the base station, and the beam measurement report carries the identification of the failed antenna panel, and the identification and signal quality information of each reference signal in the reference signal set associated with the failed antenna panel. The base station may determine that a beam failure occurs in the antenna panel based on the identification and signal quality information of each reference signal, and determine which antenna panel encounters the beam failure in the user device based on the identification of the failed antenna panel.

Further, the beam measurement report may further includes an identification and signal quality information of a reference signal in a candidate reference signal set corresponding to the antenna panel, such that the base station may configure a new beam corresponding to a new reference signal for the terminal.

It should be noted that, the identification of the failed antenna panel in the embodiment and following embodiments may be an ID of the failed antenna panel, or may be an ID of the reference signal set associated with the failed antenna panel, or may be an ID of a reference signal in the reference signal set associated with the failed antenna panel, which may be set according to requirements.

Figure 3:
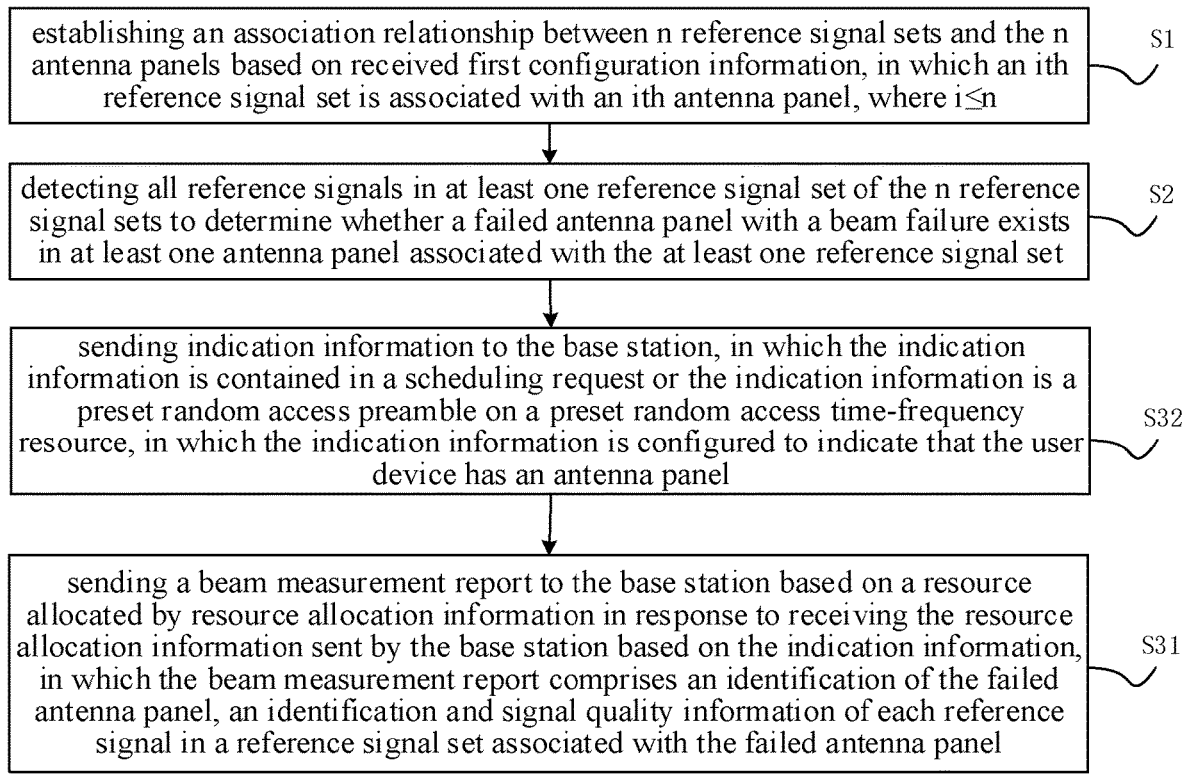
FIG. 3 is a flowchart of another method for determining a beam failure according to an embodiment of the disclosure.

FIG. 3 is a flowchart of a method for determining a beam failure according to an embodiment of the disclosure. As illustrated in FIG. 3, a process of sending the beam failure information indicating that a beam failure occurs in the failed antenna panel to the base station before sending the beam measurement report to the base station may include the following.

In S32, indication information is sent to the base station. The indication information is contained in a scheduling request or the indication information is a preset random access preamble on a preset random access time-frequency resource. The indication information is configured to indicate that the user device has an antenna panel.

If resource allocation information sent by the base station based on the indication information is received, the beam measurement report is sent to the base station based on a resource allocated by the resource allocation information.

In an embodiment, the user device may send the preset random access preamble on the preset random access time-frequency resource to the base station as the indication information, or may send the scheduling request carrying the indication information to the base station, to inform the base station that the user device has an antenna panel failed without indicating which antenna panel is the failed antenna panel.

After receiving the indication information, the base station may send the resource allocation information to the user device for which the base statin needs to determine which antenna panel is the failed antenna panel, such that the user device may send the beam measurement report based on the resource allocated by the resource allocation information (which may be a physical uplink control channel (PUCCH) resource or a physical uplink shared channel (PUSCH) resource). It is unnecessary for the base station to configure the resource of sending the beam measurement report for all the user devices, which may reduce resource allocation overhead of the base station.

Figure 4:
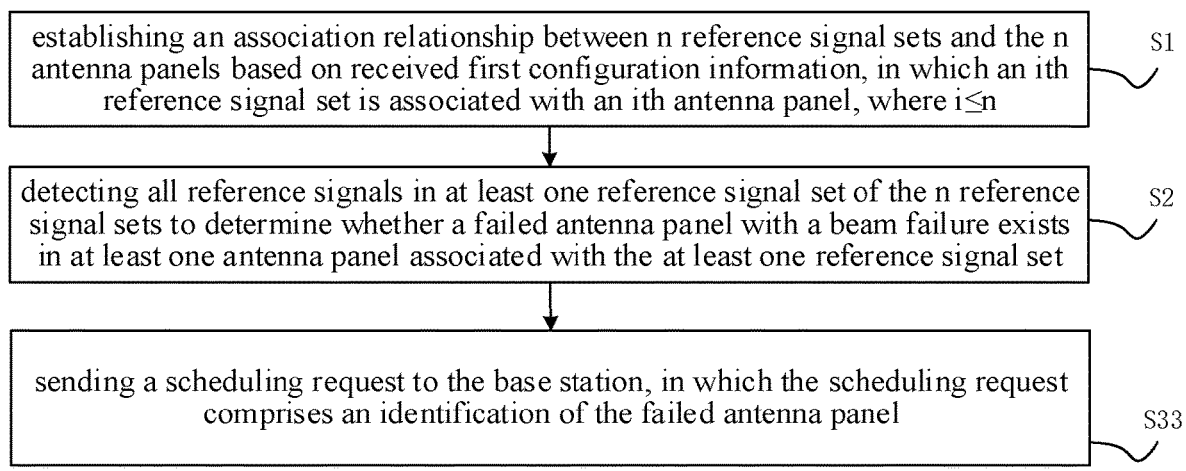
FIG. 4 is a flowchart of another method for determining a beam failure according to an embodiment of the disclosure.

FIG. 4 is a flowchart of a method for determining a beam failure according to an embodiment of the disclosure. As illustrated in FIG. 4, a process of sending the beam failure information indicating that a beam failure occurs in the failed antenna panel to the base station may include the following.

In S33, a scheduling request (SR) is sent to the base station. The scheduling request includes an identification of a failed antenna panel.

In an embodiment, the scheduling request may be sent to the base station, and the scheduling request carries the identification of the failed antenna panel. Based on the identification of the failed antenna panel, the base station may determine which antenna panel in the user device encounters a beam failure.

Figure 5:
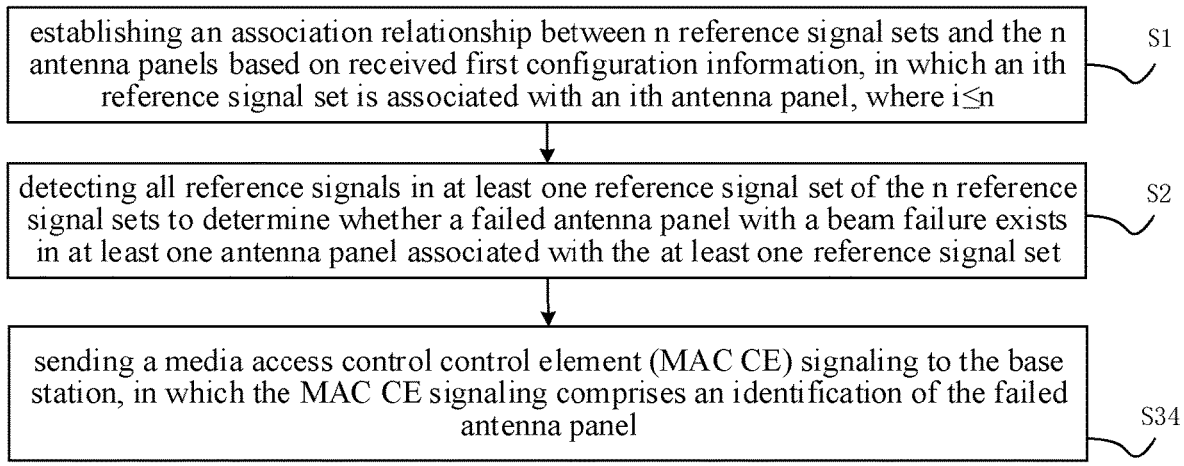
FIG. 5 is a flowchart of another method for determining a beam failure according to an embodiment of the disclosure.

FIG. 5 is a flowchart of a method for determining a beam failure according to an embodiment of the disclosure. As illustrated in FIG. 5, a process of sending the beam failure information indicating that a beam failure occurs in the failed antenna panel to the base station may include the following.

In S34, a media access control control element (MAC CE) signaling is sent to the base station. The MAC CE signaling includes an identification of the failed antenna panel.

In an embodiment, the MAC CE signaling may be sent to the base station. The MAC CE signaling carries an identification of a failed antenna panel. Based on the identification of the failed antenna panel, the base station may determine which antenna panel in the user device encounters a beam failure.

The user device may send the MAC CE signaling to the base station through the PUSCH resource. The PUSCH resource may be configured by the base station for the user device periodically through the RRC signaling.

For one antenna panel in one user device, a determination result of determining whether an antenna panel is a failed antenna panel may be different in different serving cells (on different frequency bands). Thus, for one antenna panel, there may be multiple determination results based on the number of serving cells configured for the user device, so the number of bits in the beam failure information may be determined based on the number of antenna panels in the user device, and the number of serving cells configured for the user device, so as to accurately determine which antenna panel in which serving cell is a failed antenna panel.

For example, in the MAC CE signaling, different antenna panels belonging to different serving cells may correspond to different bits. For example, in a case that the user device determines whether two antenna panels are failed antenna panels and four serving cells are configured for the user device, there may be eight determination results when configuring two antenna panels in four cells, such that eight bits in the MAC CE signaling can be determine to correspond to the eight determination results. A specific bit position is configured to indicate whether a specific antenna is a failed antenna panel in a specific cell. For example, bit "1" indicates that the specific antenna is the failed antenna panel in the specific cell, while bit "0" indicates that the specific antenna is not the failed antenna panel in the specific cell.

Figure 6:
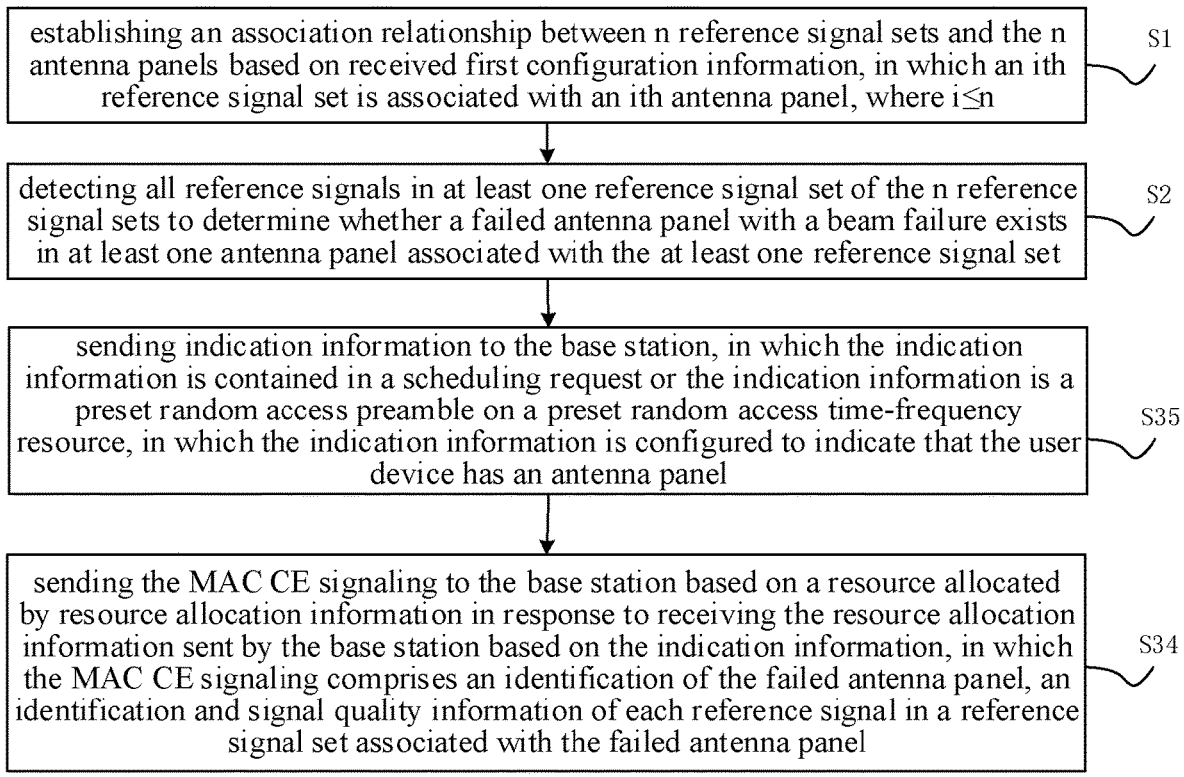
FIG. 6 is a flowchart of another method for determining a beam failure according to an embodiment of the disclosure.

FIG. 6 is a flowchart of a method for determining a beam failure according to an embodiment of the disclosure. As illustrated in FIG. 6, a process of sending the beam failure information indicating that a beam failure occurs in the failed antenna panel to the base station before sending the MAC CE signaling to the base station may include the following.

In S35, indication information is sent to the base station. The indication information is contained in a scheduling request or the indication information is a preset random access preamble on a preset random access time-frequency resource. The indication information is configured to indicate that the user device has an antenna panel.

If resource allocation information sent by the base station based on the indication information is received, the MAC CE signaling is sent to the base station based on a resource allocated by the resource allocation information.

In an embodiment, the user device may send the preset random access preamble on the preset random access time-frequency resource to the base station as the indication information, or may send the scheduling request carrying the indication information to the base station, to inform the base station that the user device has an antenna panel failed without indicating which antenna panel is the failed antenna panel.

After receiving the indication information, the base station may send the resource allocation information to the user device for which the base statin needs to determine which antenna panel is the failed antenna panel, such that the user device may send the MAC CE signaling based on the resource allocated by the resource allocation information (which may be the PUSCH resource). It is unnecessary for the base station to configure the resource of sending the MAC CE signaling for all the user devices, which may reduce resource allocation overhead of the base station.

The PUSCH resource in the embodiment is different from that in the embodiment described with reference to FIG. 5. The PUSCH resource in the embodiment of FIG. 5 is configured by the base station for the user device periodically through the RRC signaling. The PUSCH resource in the embodiment is configured by the base station for the user device dynamically through a downlink control information (DCI) signaling based on the scheduling request.

Figure 7:
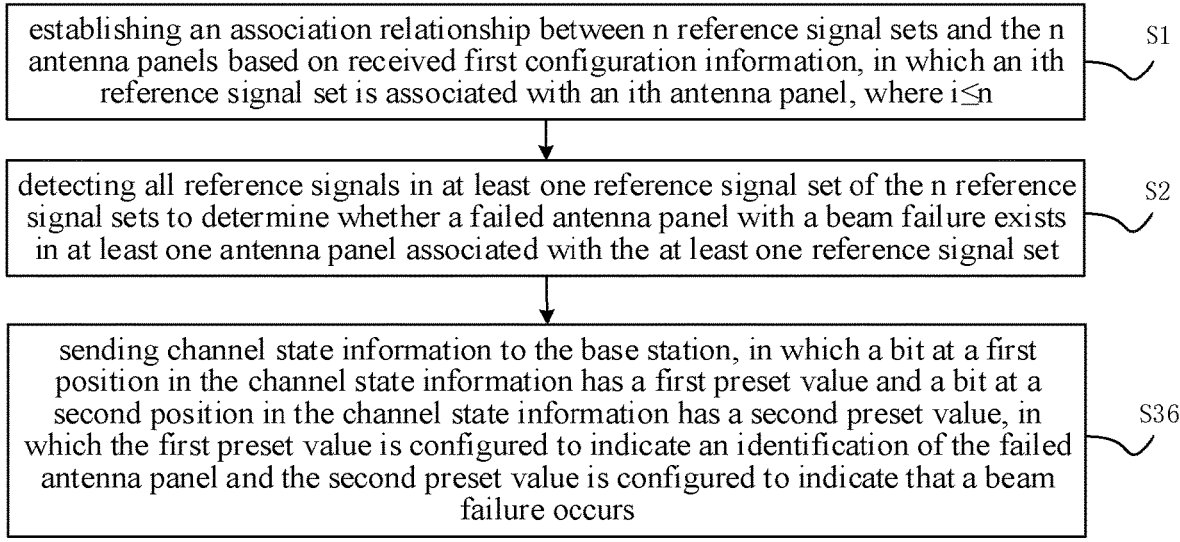
FIG. 7 is a flowchart of another method for determining a beam failure according to an embodiment of the disclosure.

FIG. 7 is a flowchart of a method for determining a beam failure according to an embodiment of the disclosure. As illustrated in FIG. 7, a process of sending the beam failure information indicating that a beam failure occurs in the failed antenna panel to the base station may include the following.

In S36, channel state information (CSI) is sent to the base station. A bit at a first position in the channel state information has a first preset value and a bit at a second position in the channel state information has a second preset value, in which the first preset value is configured to indicate an identification of the failed antenna panel and the second preset value is configured to indicate that a beam failure occurs.

In an embodiment, the channel state information may be sent to the base station. The channel state information carries an identification of a failed antenna panel. Based on the identification of the failed antenna panel, the base station may determine which antenna panel in the user device encounters a beam failure.

The bit at the first position in the channel state information may be configured to represent the identification of the antenna panel, and the bit at the second position in the channel state information may be configured to indicate whether the beam failure occurs. Each of the first position and the second position may contain one or more bits. When there are multiple bits, the multiple bits may be continuous, or may be discrete.

The base station may determine which antenna panel encounters the beam failure based on the bits at the first position and the second position. When all the antenna panels encounter the beam failure, preset values may be set for the bits at the first position and the second position, for example, the bits at the first position and the second position are set to 0 or 1.

Figure 8:
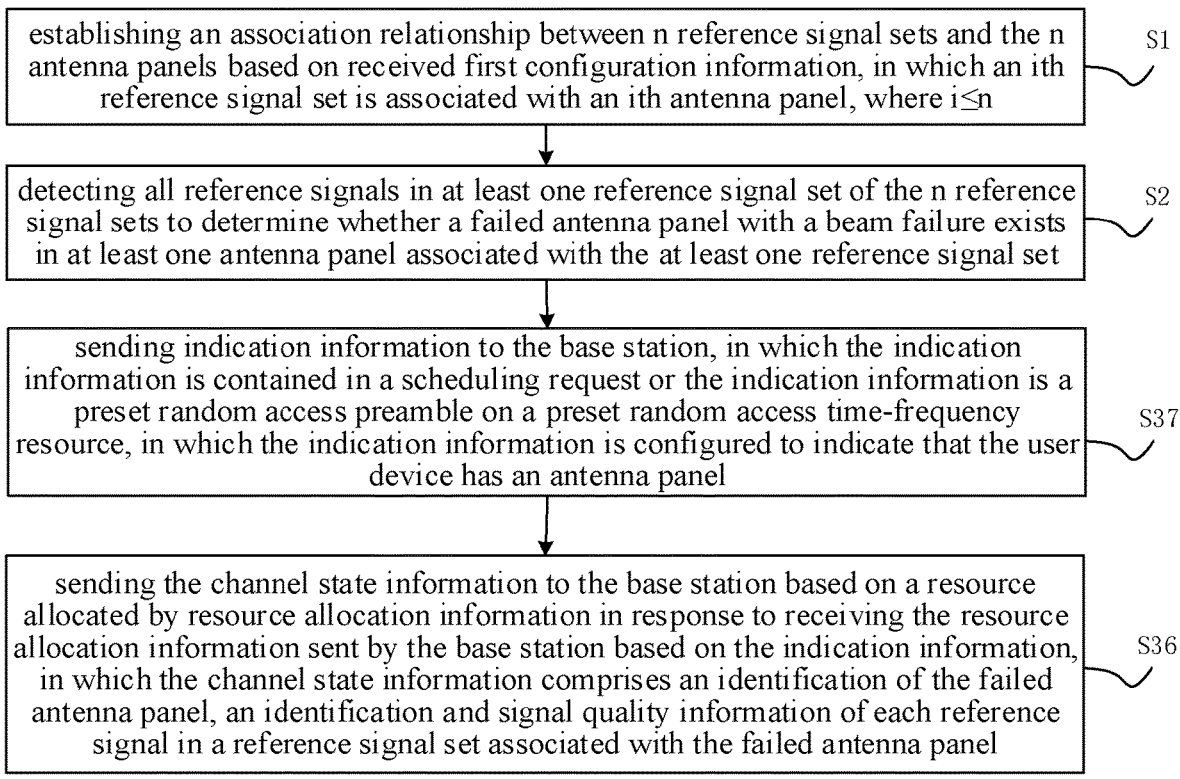
FIG. 8 is a flowchart of another method for determining a beam failure according to an embodiment of the disclosure.

FIG. 8 is a flowchart of a method for determining a beam failure according to an embodiment of the disclosure. As illustrated in FIG. 8, a process of sending the beam failure information indicating that a beam failure occurs in the failed antenna panel to the base station before sending the channel state information to the base station may include the following.

In S37, indication information is sent to the base station. The indication information is contained in a scheduling request or the indication information is a preset random access preamble on a preset random access time-frequency resource. The indication information is configured to indicate that the user device has an antenna panel.

If resource allocation information sent by the base station based on the indication information is received, the channel state information is sent to the base station based on a resource allocated by the resource allocation information.

In an embodiment, the user device may send the preset random access preamble on the preset random access time-frequency resource to the base station as the indication information, or may send the scheduling request carrying the indication information to the base station, to inform the base station that the user device has an antenna panel failed without indicating which antenna panel is the failed antenna panel.

After receiving the indication information, the base station may send the resource allocation information to the user device for which the base statin needs to determine which antenna panel is the failed antenna panel, such that the user device may send the channel state information based on the resource allocated by the resource allocation information (which may be the PUCCH resource or the PUSCH resource). It is unnecessary for the base station to configure the resource of sending the channel state information for all the user devices, which may reduce resource allocation overhead of the base station.

Figure 9:
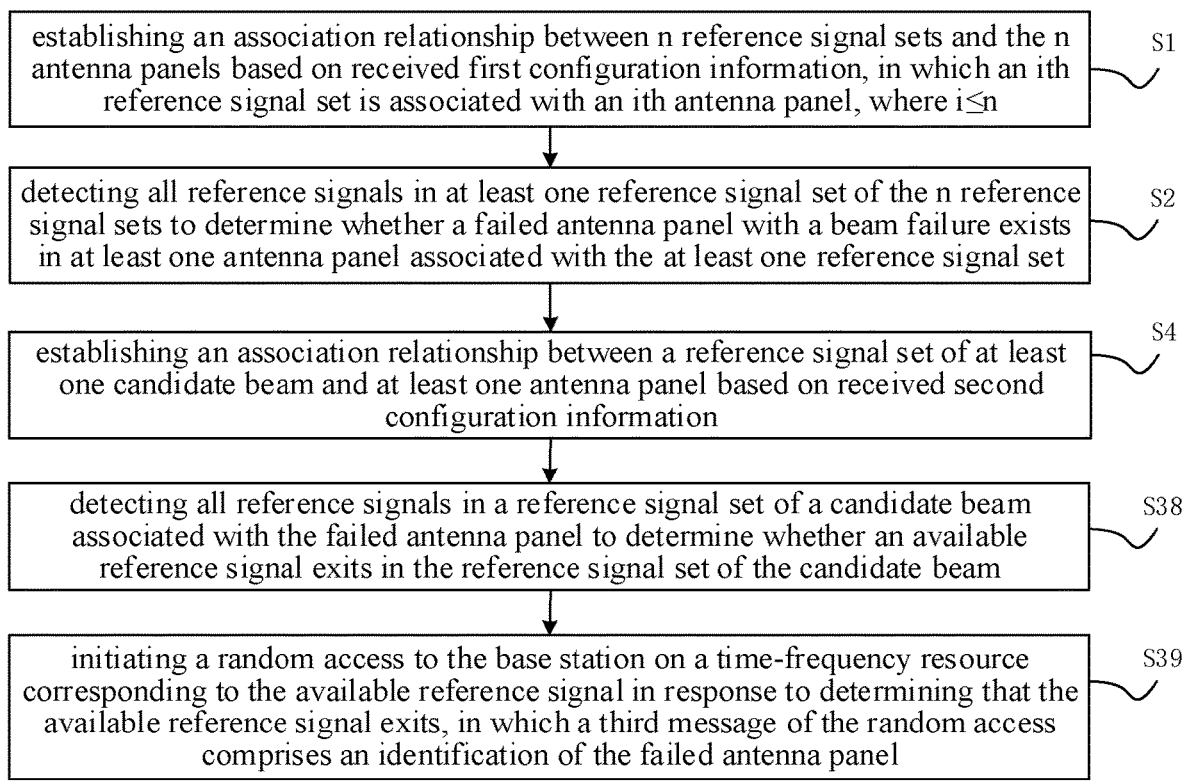
FIG. 9 is a flowchart of another method for determining a beam failure according to an embodiment of the disclosure.

FIG. 9 is a flowchart of a method for determining a beam failure according to an embodiment of the disclosure. As illustrated in FIG. 9, a process of sending the beam failure information indicating that a beam failure occurs in the failed antenna panel to the base station may include the following.

In S4, an association relationship between a reference signal set of at least one candidate beam and at least one antenna panel is established based on received second configuration information.

In an embodiment, the base station may send the second configuration information to the user device through a RRC message.

The beam failure information indicating that a beam failure occurs in the failed antenna panel is sent to the base station as follows.

In S38, all reference signals in a reference signal set of a candidate beam associated with the failed antenna panel are detected to determine whether an available reference signal exits in the reference signal set of the candidate beam.

In S39, in response to determining that the available reference signal exits, a random access is initiated to the base station on a time-frequency resource corresponding to the available reference signal. A third message (MSG 3 for short) of the random access includes an identification of the failed antenna panel.

In an embodiment, the user device may establish the association relationship between the reference signal set of the candidate beam and the antenna panel based on the second configuration information, and may detect the reference signals in the reference signal set of the candidate beam associated with the failed antenna panel to determine whether the available reference signal exits in the reference signal set of the candidate beam when sending the beam failure information to the base station.

For example, for a certain candidate beam, it may be determined whether the available reference signal having a signal quality higher than a second quality threshold exits in the reference signal set of the candidate beam. If the available reference signal exits, it may be determined that a communication between the failed antenna panel and the base station through the time-frequency resource (the time-frequency resource is transmitted through the beam corresponding to the available reference signal) corresponding to the available reference signal may reach an expected communication quality, such that the random access may be initiated to the base station on the time-frequency resource corresponding to the available reference signal.

However, since the candidate reference signal sets associated with different antenna panels may be the same, that is, the time-frequency resources of the reference signals corresponding to different antenna panels may be the same, different failed antenna panels may initiate the random access to the base station on the time-frequency resource corresponding to the same reference signal, such that merely the time-frequency resource of the reference signal is insufficient for the base station to determine the failed antenna panel with the beam failure.

In order to ensure that the base station can determine the failed antenna panel, the third message of the random access may carry the identification of the failed antenna panel, such that the base station may accurately determine the failed antenna panel with the beam failure based on the identification of the failed antenna panel carried in the third message of the random access.

Figure 10:
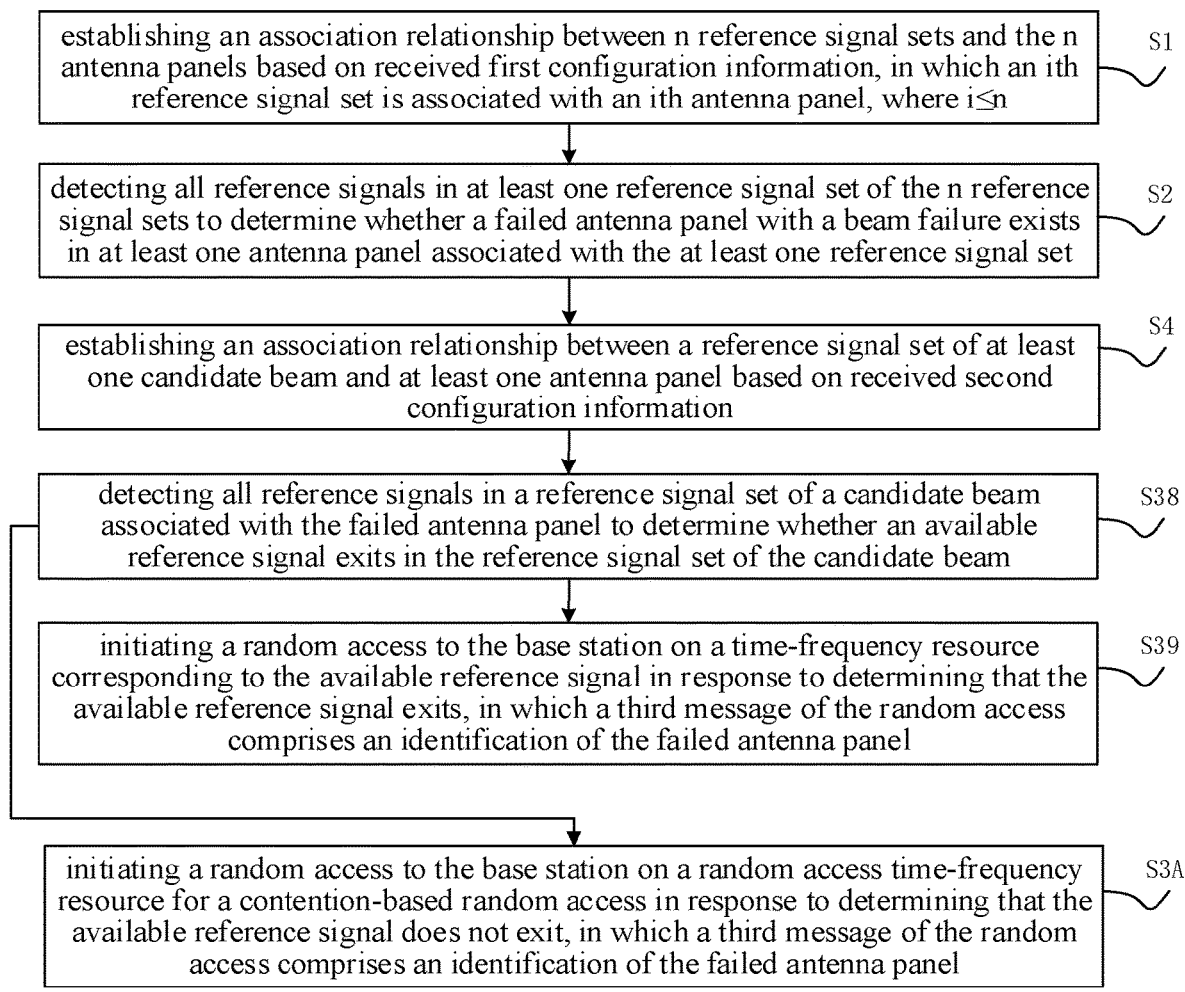
FIG. 10 is a flowchart of another method for determining a beam failure according to an embodiment of the disclosure.

FIG. 10 is a flowchart of a method for determining a beam failure according to an embodiment of the disclosure. As illustrated in FIG. 10, a process of sending the beam failure information indicating that a beam failure occurs in the failed antenna panel to the base station may include the following.

In S3A, in response to determining that the available reference signal does not exit, a random access (the transmitted random access preamble is a competitive random access preamble) is initiated to the base station on a random access time-frequency resource for a contention-based random access (a competitive random access time-frequency resource). The third message of the random access includes the identification of the failed antenna panel.

In an embodiment, if the available reference signal does not exit, the user device may initiate the random access to the base station on the random access resource, and the third message of the random access carries the identification of the failed antenna panel.

Since the random access resource in the embodiment is not the time-frequency resource corresponding to the available reference signal, the random access resource has weaker stability than the time-frequency resource corresponding to the available reference signal, but can still ensure to some extent that the user device can inform the base station of the identification of the failed antenna panel through the third message of the random access.

Figure 11:
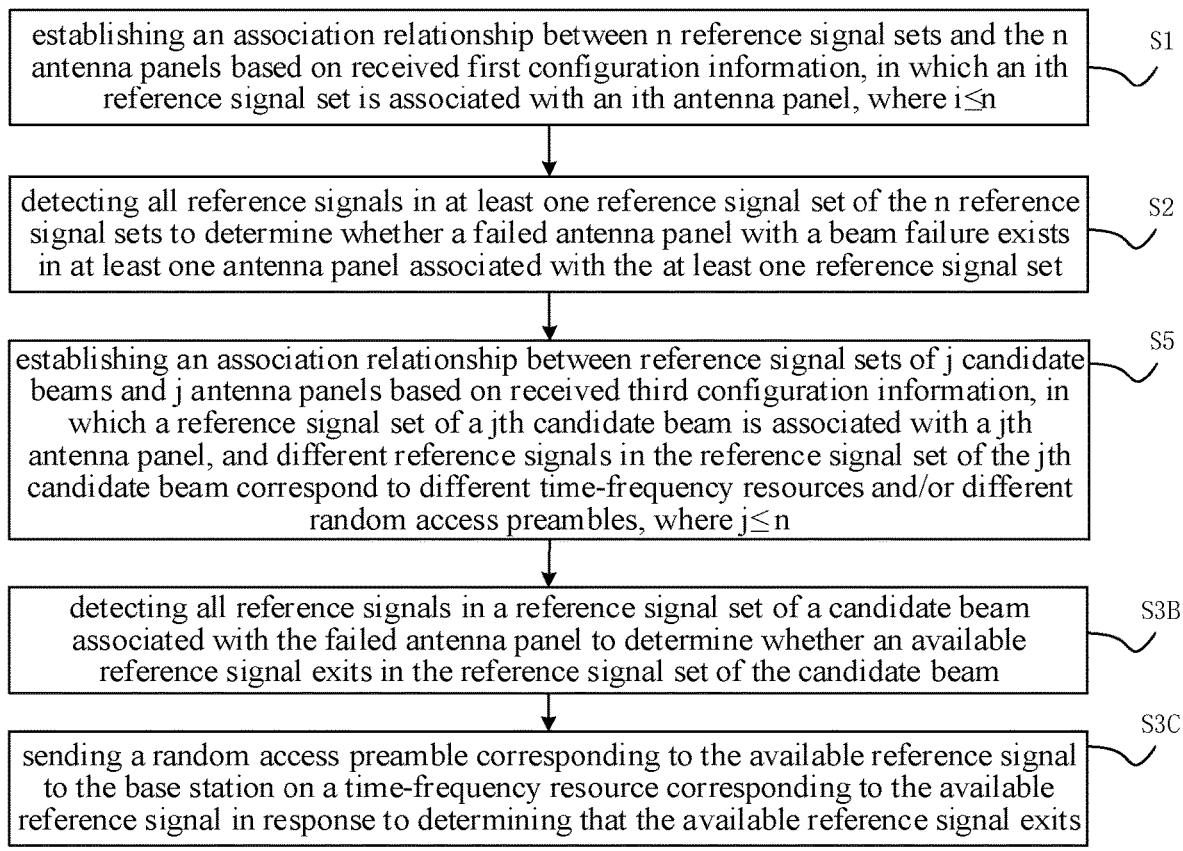
FIG. 11 is a flowchart of another method for determining a beam failure according to an embodiment of the disclosure.

FIG. 11 is a flowchart of a method for determining a beam failure according to an embodiment of the disclosure. As illustrated in FIG. 11, before the beam failure information indicating that a beam failure occurs in the failed antenna panel is sent to the base station, the method may further include the following.

In S5, an association relationship between reference signal sets of j candidate beams and j antenna panels is established based on received third configuration information. A reference signal set of a j-th candidate beam is associated with a j-th antenna panel, and different reference signals in the reference signal set of the j-th candidate beam correspond to different time-frequency resources and/or different random access preambles, where j≤n.

In an embodiment, the base station may send the third configuration information to the user device through a RRC message.

The beam failure information indicating that a beam failure occurs in the failed antenna panel is sent to the base station as follows.

In S3B, reference signals in a reference signal set of a candidate beam associated with the failed antenna panel are detected to determine whether an available reference signal exits in the reference signal set of the candidate beam.

In S3C, in response to determining that the available reference signal exits, a random access preamble corresponding to the available reference signal is sent to the base station on a time-frequency resource.

In an embodiment, the user device may establish the association relationship between the reference signal sets of the candidate beams and the antenna panels, and may detect the reference signals in the reference signal set of the candidate beam associated with the failed antenna panel to determine whether the available reference signal exits in the reference signal set of the candidate beam when sending the beam failure information to the base station.

It should be noted that, unlike the embodiment described with reference to FIG. 9, in this embodiment, the reference signal set of the j-th candidate beam is configured to be associated with the j-th antenna panel at the same time when the association relationship between the reference signal sets of the j candidate beams and the j antenna panels is established, and different reference signals in the reference signal set of the j-th candidate beam correspond to different time-frequency resources and/or different random access preambles.

Accordingly, it may be ensured that different antenna panels are associated with different reference signal sets, and different reference signals correspond to different time-frequency resources and/or different random access preambles, such that different antenna panels correspond to different time-frequency resources and/or different random access preambles.

For example, for a certain candidate beam, it may be determined whether the available reference signal having a signal quality higher than a second quality threshold exits in the reference signal set of the candidate beam. If the available reference signal exits, it may be determined that a communication between the failed antenna panel and the base station through the beam corresponding to the available reference signal may reach an expected communication quality, such that the random access may be initiated to the base station on the time-frequency resource corresponding to the available reference signal.

Since different antenna panels correspond to different time-frequency resources and/or different random access preambles, for example, different antenna panels correspond to different time-frequency resources, different failed antenna panels need to initiate the random access to the base station on the time-frequency resources corresponding to different reference signals, and the base station may determine the failed antenna panel with the beam failure based on merely the time-frequency resource of the reference signal.

For example, different antenna panels correspond to different random access preambles, different failed antenna panels need to send different random access preambles when initiating the ransom access to the base station, the base station may determine the failed antenna panel with the beam failure based on merely the random access preamble.

Based on the embodiment of FIG. 11, merely the first message (MSG1 for short) of the random access carrying the random access preamble needs to send without sending the third message of the random access to the base station, and the base station may determine which antenna panel encounters the beam failure. The embodiments of FIG. 9 and FIG. 11 can be selected according to actual requirements.

Figure 12:
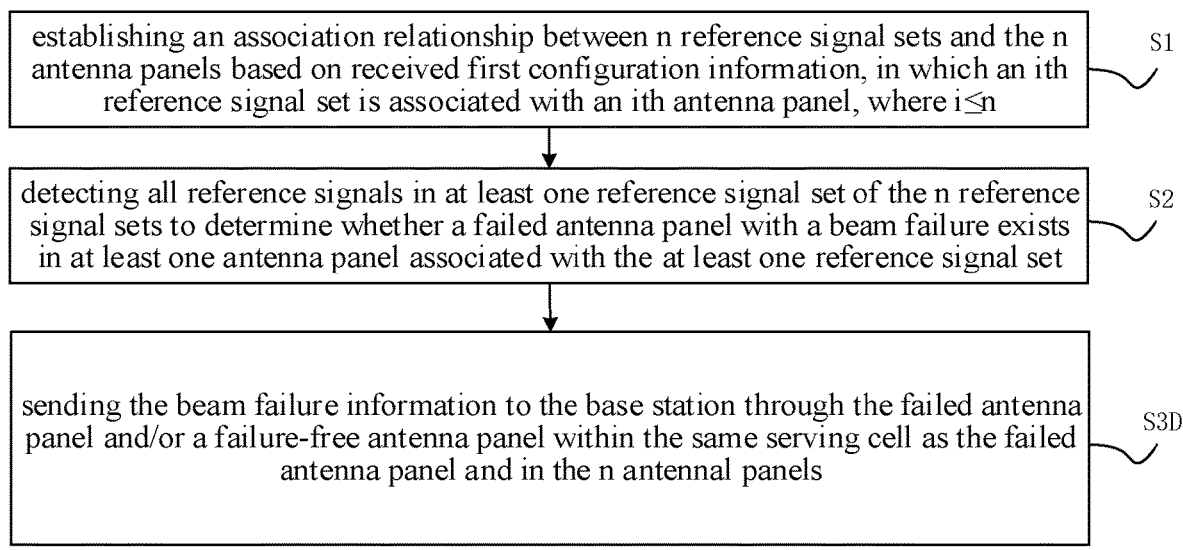
FIG. 12 is a flowchart of another method for determining a beam failure according to an embodiment of the disclosure.

FIG. 12 is a flowchart of a method for determining a beam failure according to an embodiment of the disclosure. As illustrated in FIG. 12, a process of sending the beam failure information indicating that a beam failure occurs in the failed antenna panel to the base station may include the following.

In S3D, the beam failure information is sent to the base station through the failed antenna panel and/or a failure-free antenna panel within the same serving cell as the failed antenna panel and in the n antennal panels.

In an embodiment, the user device may send the beam failure information to the base station through the failed antenna panel or through the failure-free antenna panel within the same serving cell as the failed antenna panel and in the n antennal panels. Accordingly, even when the failed antenna panel has a problem in the uplink transmission, the beam failure information may be sent successfully to the base station through the failure-free antenna panel, such that the base station may determine which antenna panel in the user device encounters the beam failure.

Figure 13:
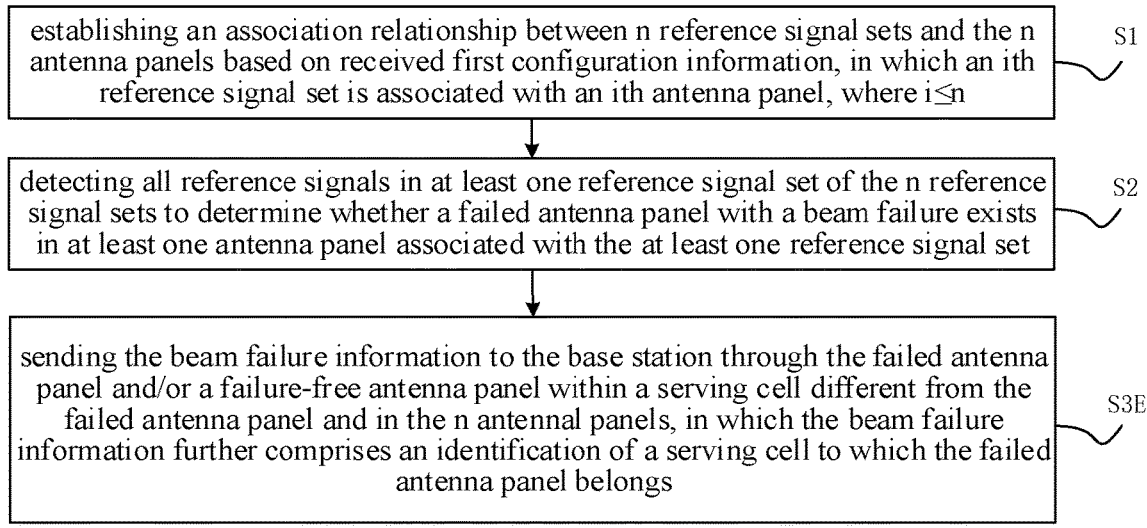
FIG. 13 is a flowchart of another method for determining a beam failure according to an embodiment of the disclosure.

FIG. 13 is a flowchart of a method for determining a beam failure according to an embodiment of the disclosure. As illustrated in FIG. 13, a process of sending the beam failure information indicating that a beam failure occurs in the failed antenna panel to the base station may include the following.

In S3E, the beam failure information is sent to the base station through the failed antenna panel and/or a failure-free antenna panel within a serving cell different from the failed antenna panel and in the n antennal panels. The beam failure information further includes an identification of a serving cell to which the failed antenna panel belongs.

In an embodiment, the user device may send the beam failure information to the base station through the failed antenna panel or through the failure-free antenna panel within the serving cell different from the failed antenna panel and in the n antennal panels (i.e., cross-carrier transmission). Accordingly, even when the failed antenna panel has a problem in the uplink transmission, the beam failure information may be sent successfully to the base station through the failure-free antenna panel, such that the base station may determine which antenna panel in the user device encounters the beam failure.

It should be noted that, when the beam failure information is sent through the failure-free antenna panel within the serving cell different from the failed antenna panel and in the n antennal panels, the beam failure information may further include the identification of the serving cell to which the failed antenna panel belongs, so that the base station may determine the serving cell to which the failed antenna panel belongs.

Alternatively, the serving cell includes at least one of a primary cell; a primary secondary cell; and a secondary cell.

Figure 14:
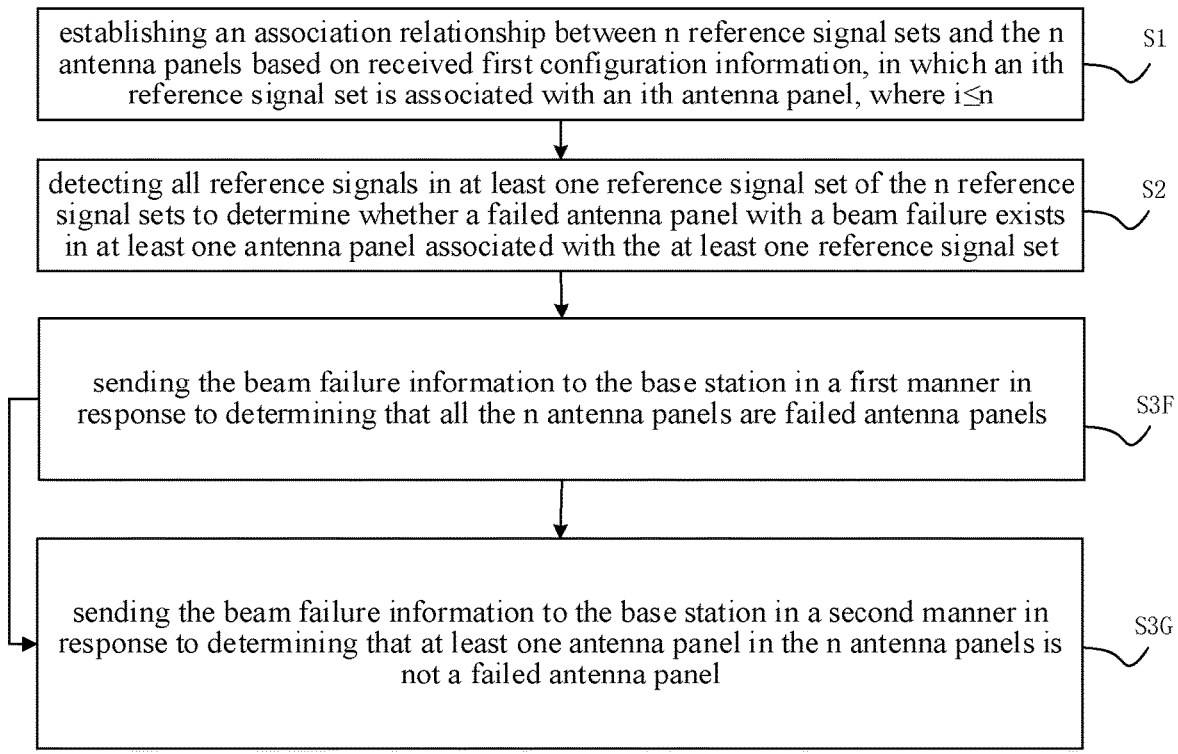
FIG. 14 is a flowchart of another method for determining a beam failure according to an embodiment of the disclosure.

FIG. 14 is a flowchart of a method for determining a beam failure according to an embodiment of the disclosure. As illustrated in FIG. 14, there may be many manners of sending the beam failure information indicating that a beam failure occurs in the failed antenna panel to the base station, and a process of sending the beam failure information indicating that a beam failure occurs in the failed antenna panel to the base station may include the following.

In S3F, in response to determining that all the n antenna panels are failed antenna panels, the beam failure information is sent to the base station in a first manner.

In S3G, in response to determining that at least one antenna panel in the n antenna panels is not a failed antenna panel, the beam failure information is sent to the base station in a second manner.

A time delay from determining that the beam failure occurs in the failed antenna panel to enabling the base station to determine that the beam failure occurs in the failed antenna panel in the first manner is less than a time delay from determining that the beam failure occurs in the failed antenna panel to enabling the base station to determine that the beam failure occurs in the failed antenna panel in the second manner.

In an embodiment, if all the n antenna panels in the user device are failed antenna panels with the beam failure, the user device cannot communicate with the base station, in this case, based on the embodiment, the beam failure information may be sent to the base station in the first manner, so as to enable the base station to determine that the beam failure occurs in the failed antenna panel timely after the beam failure occurs in the failed antenna panel, such that the beam failure recovery can be performed timely to recover a normal communication between the base station and the user device.

Accordingly, if at least one antenna panel in the n antenna panels in the user device is not the failed antenna panel, that is, the user device may communicate with the base station through the at least one antenna panel normally, in this case, based on the embodiment, the beam failure information may be sent to the base station in the second manner, such that the user device may preferentially recover the communication with the user device which sends the beam failure information to the base station in the first manner.

The first manner and the second manner may be selected according to requirements. For example, the first manner may be a manner of initiating a random access to the base station in the embodiment described with reference in FIG. 9 or FIG. 11, and the second manner may be a manner of sending the beam measurement report in the embodiment described with reference in FIG. 2 or a manner of sending the MAC CE signaling in the embodiment described with reference in FIG. 4.

Figure 15:
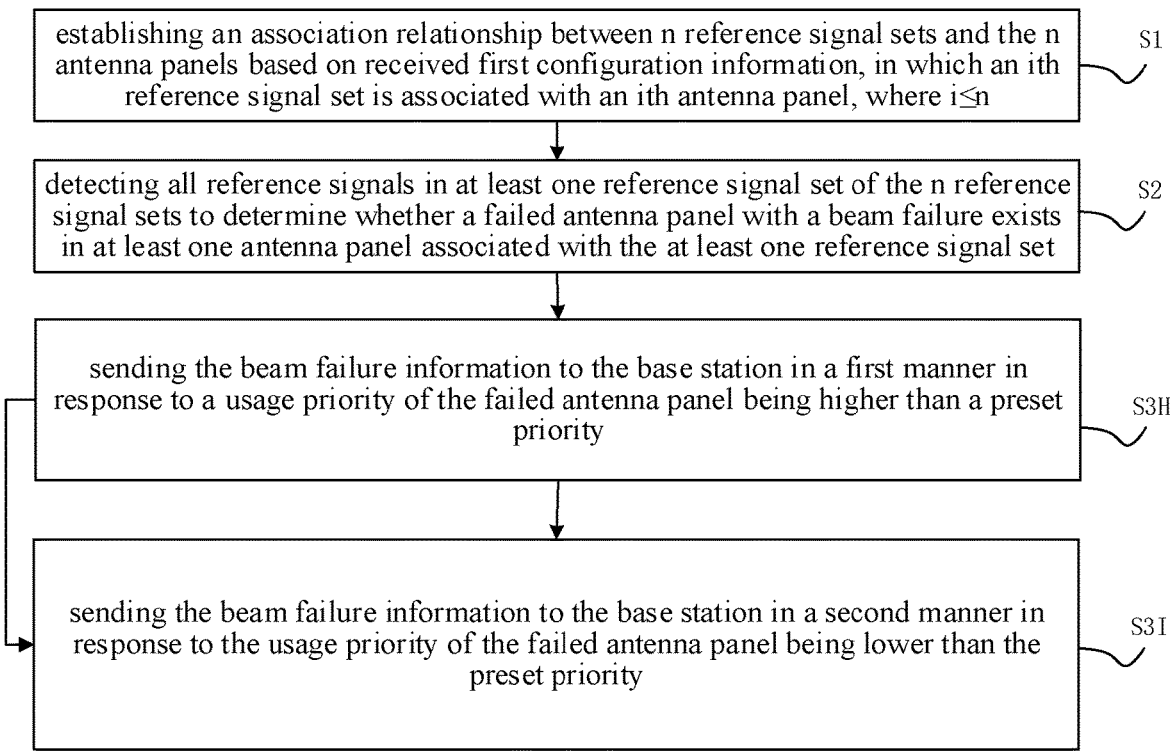
FIG. 15 is a flowchart of another method for determining a beam failure according to an embodiment of the disclosure.

FIG. 15 is a flowchart of a method for determining a beam failure according to an embodiment of the disclosure. As illustrated in FIG. 15, there may be many manners of sending the beam failure information indicating that a beam failure occurs in the failed antenna panel to the base station, and a process of sending the beam failure information indicating that a beam failure occurs in the failed antenna panel to the base station may include the following.

In S3H, in response to a usage priority of the failed antenna panel being higher than a preset priority, the beam failure information is sent to the base station in a first manner.

In S3G, in response to the usage priority of the failed antenna panel being lower than the preset priority, the beam failure information is sent to the base station in a second manner.

A time delay from determining that the beam failure occurs in the failed antenna panel to enabling the base station to determine that the beam failure occurs in the failed antenna panel in the first manner is less than a time delay from determining that the beam failure occurs in the failed antenna panel to enabling the base station to determine that the beam failure occurs in the failed antenna panel in the second manner.

The usage priority may be configured in advance before the user device leaves the factory, or may be set by a user according to requirements after the user device leaves the factory. For example, after a certain antenna panel is replaced, the antenna panel theoretically has a relative long service life, then the antenna panel may be configured with a higher usage priority. Or, the usage priority may be set according to the base station configurations, for example, for a user device in carrier aggregation, the antenna panel is the primary cell has a higher usage priority than the antenna panel in the secondary cell.

In an embodiment, if the antenna panel with a higher usage priority in the n antenna panels of the user device encounters the beam failure, a communication failure of the user device may be caused more likely than a situation that the antenna panel with a lower usage priority encounters the beam failure. For example, the antenna panel with the higher usage priority may belong to the primary cell of the terminal and the antenna panel with the lower usage priority may belong to the secondary cell of the terminal. When the antenna panel with the higher usage priority encounters the beam failure and does not recover, and the user uses the antenna panel with the lower usage priority to communicate with the base station, information which can be transmitted merely in the primary, such as the RRC signaling cannot be transmitted normally, which may affect the communication.

Based on the embodiment, if the antenna panel with the higher usage priority (higher than the preset priority) encounters the beam failure, the beam failure information may be sent to the base station in the first manner, so as to enable the base station to determine that the beam failure occurs in the failed antenna panel timely after the beam failure occurs in the failed antenna panel, such that the beam failure recovery can be performed timely to enable the user device to continue use the antenna panel with the higher usage priority for communication.

Accordingly, if the antenna panel with the lower usage priority (lower than the preset priority) encounters the beam failure, based on the embodiment, the beam failure information may be sent to the base station in the second manner, such that the user device may preferentially recover the communication with the user device which sends the beam failure information to the base station in the first manner.

The first manner and the second manner may be selected according to requirements. For example, the first manner may be a manner of initiating a random access to the base station in the embodiment described with reference in FIG. 9 or FIG. 11, and the second manner may be a manner of sending the beam measurement report in the embodiment described with reference in FIG. 2 or a manner of sending the MAC CE signaling in the embodiment described with reference in FIG. 4.

Figure 16:
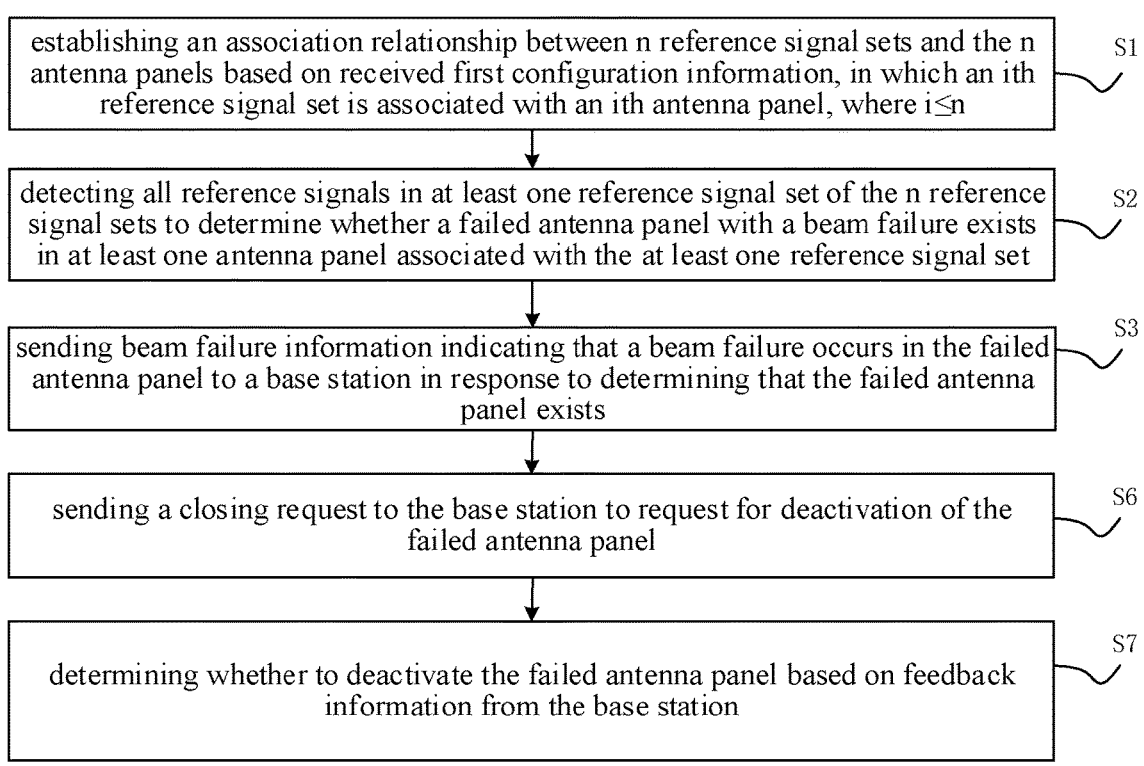
FIG. 16 is a flowchart of another method for determining a beam failure according to an embodiment of the disclosure.

FIG. 16 is a flowchart of a method for determining a beam failure according to an embodiment of the disclosure. As illustrated in FIG. 16, the method further includes the following.

In S6, a closing request is sent to the base station to request for deactivation of the failed antenna panel.

In S7, it is determined whether to deactivate the failed antenna panel based on feedback information from the base station.

In an embodiment, the closing request can be sent to the base station to request for the deactivation of the failed antenna panel and it may be determined whether to deactivate the failed antenna panel based on the feedback information from the base station. If it is determined that the failed antenna panel is deactivated, the failed antenna panel is deactivated.

Accordingly, the failed antenna panel may be deactivated based on the feedback information from the base station, so as to present the failed antenna panel from consuming power, such that the electricity of the user device can be saved, and the requirements of the user device may be improved.

It should be noted that, for the user device in carrier aggregation, if a failed antenna panel encounters the beam failure merely in a certain secondary cell, the antenna panel is deactivated merely on a frequency band of the secondary cell but continues to maintain activated in other secondary cells or the primary cell.

If the base station requests the terminal to activate the failed antenna panel based on business needs, the base station needs to send an activation signaling to the terminal again to activate the failed antenna panel. Or the terminal actively activates the failed antenna panel based on business needs and sends a message to inform the base station that the failed antenna panel is activated already.

Figure 17:
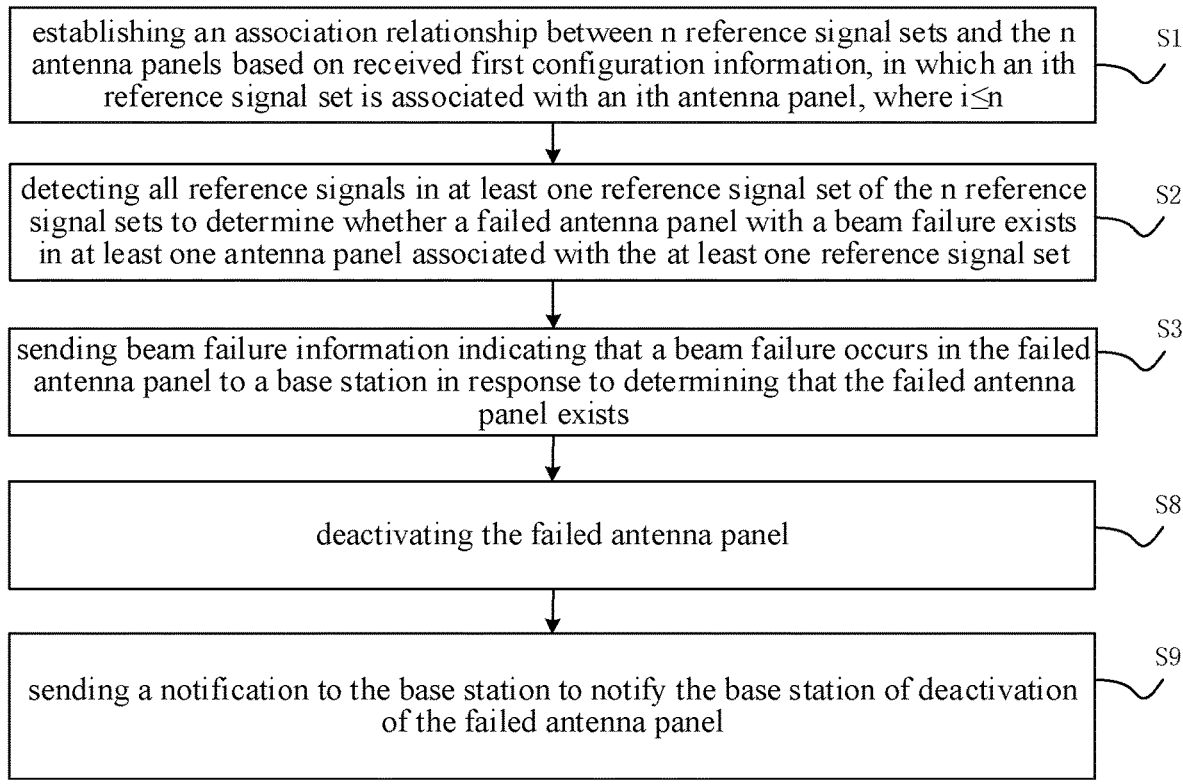
FIG. 17 is a flowchart of another method for determining a beam failure according to an embodiment of the disclosure.

FIG. 17 is a flowchart of a method for determining a beam failure according to an embodiment of the disclosure. As illustrated in FIG. 17, the method further includes the following.

In S8, the failed antenna panel is deactivated.

In S9, a notification is sent to the base station to notify the base station of deactivation of the failed antenna panel.

In an embodiment, the failed antenna panel may be deactivated, and the notification may be sent to the base station to notify the base station that the failed antenna panel is deactivated already.

Accordingly, the failed antenna panel may be deactivated, so as to present the failed antenna panel from consuming power, such that the electricity of the user device can be saved, and the requirements of the user device may be improved. The notification may be sent to the base station to notify the base station that the failed antenna panel is deactivated already, such that the base station determines which antenna panel in the user device is deactivated.

The terminal actively activates the failed antenna panel based on business needs and sends a message to inform the base station that the failed antenna panel is activated already. Or the base station requests the terminal to activate the failed antenna panel based on business needs, the base station needs to send an activation signaling to the terminal again to activate the failed antenna panel.

Corresponding to the foregoing embodiments of the method for determining a beam failure, the present disclosure further provides embodiments of the apparatus for determining a beam failure.

Figure 18:
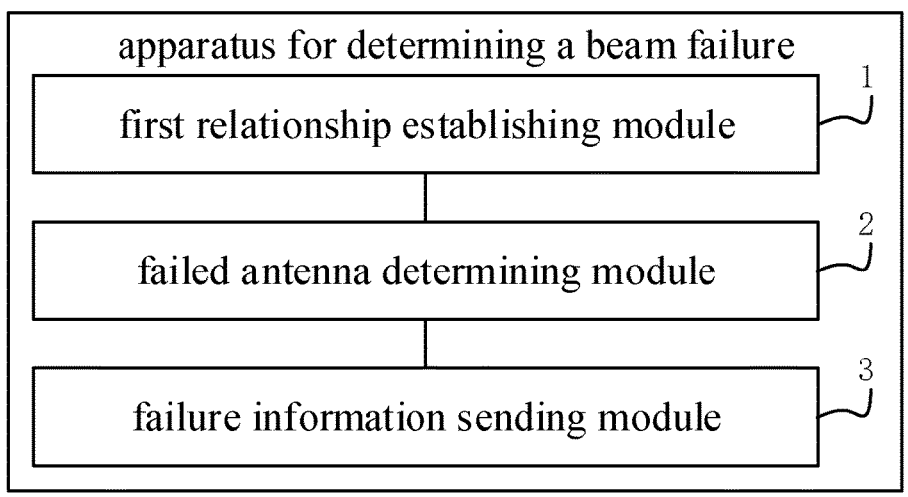
FIG. 18 is a block diagram of an apparatus for determining a beam failure according to an embodiment of the disclosure.

FIG. 18 is a block diagram of an apparatus for determining a beam failure according to an embodiment of the disclosure. The apparatus in the embodiment may be applied a user device. The user device may be a phone, a tablet, a wearable device, a vehicle-mounted device or other electronic devices. The user device may communicate with a base station, for example, communicate with the base station based on 4G or 5G.

The user device includes n antenna panels, where n is an integer greater than or equal to 1. Each antenna panel may emit beams in multiple directions, and emits a beam in one direction at one moment.

As illustrated in FIG. 18, the apparatus may include a first relationship establishing module 1, a failed antenna determining module 2, and a failure information sending module 3.

The first relationship establishing module 1 is configured to establish an association relationship between n reference signal sets and the n antenna panels based on received first configuration information, in which an i-th reference signal set is associated with an i-th antenna panel, where i≤n.

The failed antenna determining module 2 is configured to detect all reference signals in at least one reference signal set of the n reference signal sets to determine whether a failed antenna panel with a beam failure exists in at least one antenna panel associated with the at least one reference signal set.

The failure information sending module 3 is configured to send beam failure information indicating that a beam failure occurs in the failed antenna panel to a base station in response to determining that the failed antenna panel exists.

Alternatively, the failure information sending module is configured to: send a beam measurement report to the base station, in which the beam measurement report comprises an identification of the failed antenna panel, an identification and signal quality information of each reference signal in a reference signal set associated with the failed antenna panel.

Alternatively, before sending the beam measurement report to the base station, the failure information sending module is further configured to send indication information to the base station, in which the indication information is contained in a scheduling request or the indication information is a preset random access preamble on a preset random access time-frequency resource, in which the indication information is configured to indicate that the user device has an antenna panel.

The beam measurement report is sent to the base station based on a resource allocated by resource allocation information in response to receiving the resource allocation information sent by the base station based on the indication information.

Alternatively, the failure information sending module is configured to: send a media access control control element (MAC CE) signaling to the base station, in which the MAC CE signaling comprises an identification of the failed antenna panel.

Alternatively, before sending the MAC CE signaling to the base station, the failure information sending module is further configured to: send indication information to the base station, in which the indication information is contained in a scheduling request or the indication information is a preset random access preamble on a preset random access time-frequency resource, in which the indication information is configured to indicate that the user device has an antenna panel.

The MAC CE signaling is sent to the base station based on a resource allocated by resource allocation information in response to receiving the resource allocation information sent by the base station based on the indication information.

Alternatively, the failure information sending module is configured to: send a scheduling request to the base station, in which the scheduling request comprises an identification of the failed antenna panel.

Alternatively, the failure information sending module is configured to: send channel state information to the base station, in which a bit at a first position in the channel state information has a first preset value and a bit at a second position in the channel state information has a second preset value, in which the first preset value is configured to indicate an identification of the failed antenna panel and the second preset value is configured to indicate that a beam failure occurs.

Alternatively, before sending the channel state information to the base station, the failure information sending module is further configured to: send indication information to the base station, in which the indication information is contained in a scheduling request or the indication information is a preset random access preamble on a preset random access time-frequency resource, in which the indication information is configured to indicate that the user device has an antenna panel.

The channel state information is sent to the base station based on a resource allocated by resource allocation information in response to receiving the resource allocation information sent by the base station based on the indication information.

Figure 19:
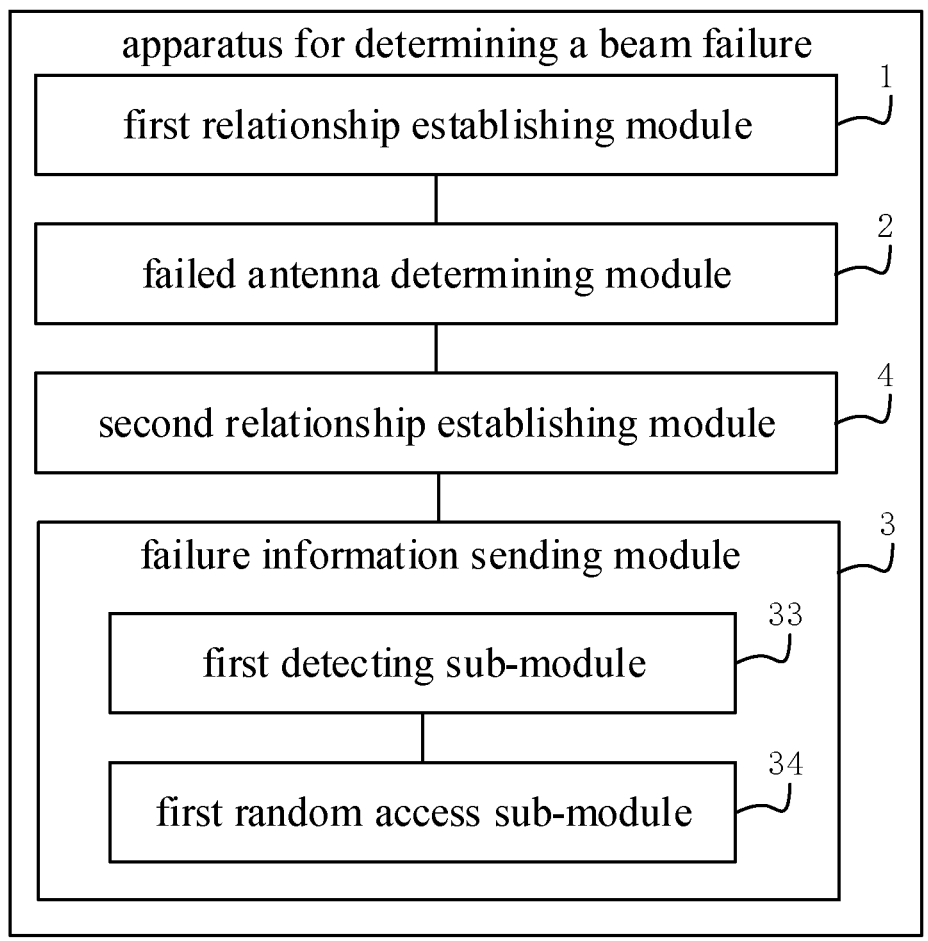
FIG. 19 is a block diagram of another apparatus for determining a beam failure according to an embodiment of the disclosure.

FIG. 19 is a block diagram of an apparatus for determining a beam failure according to an embodiment of the disclosure. As illustrated in FIG. 19, the apparatus further includes a second relationship establishing module 4.

The a second relationship establishing module 4 is establish an association relationship between a reference signal set of at least one candidate beam and at least one antenna panel based on received second configuration information.

The failure information sending module 3 includes a first detecting sub-module 33 and a first random access sub-module 34.

The first detecting sub-module 33 is configured to detect all reference signals in a reference signal set of a candidate beam associated with the failed antenna panel to determine whether an available reference signal exits in the reference signal set of the candidate beam.

The first random access sub-module 34 is configured to initiate a random access to the base station on a time-frequency resource corresponding to the available reference signal in response to determining that the available reference signal exits, in which a third message of the random access comprises an identification of the failed antenna panel.

Figure 20:
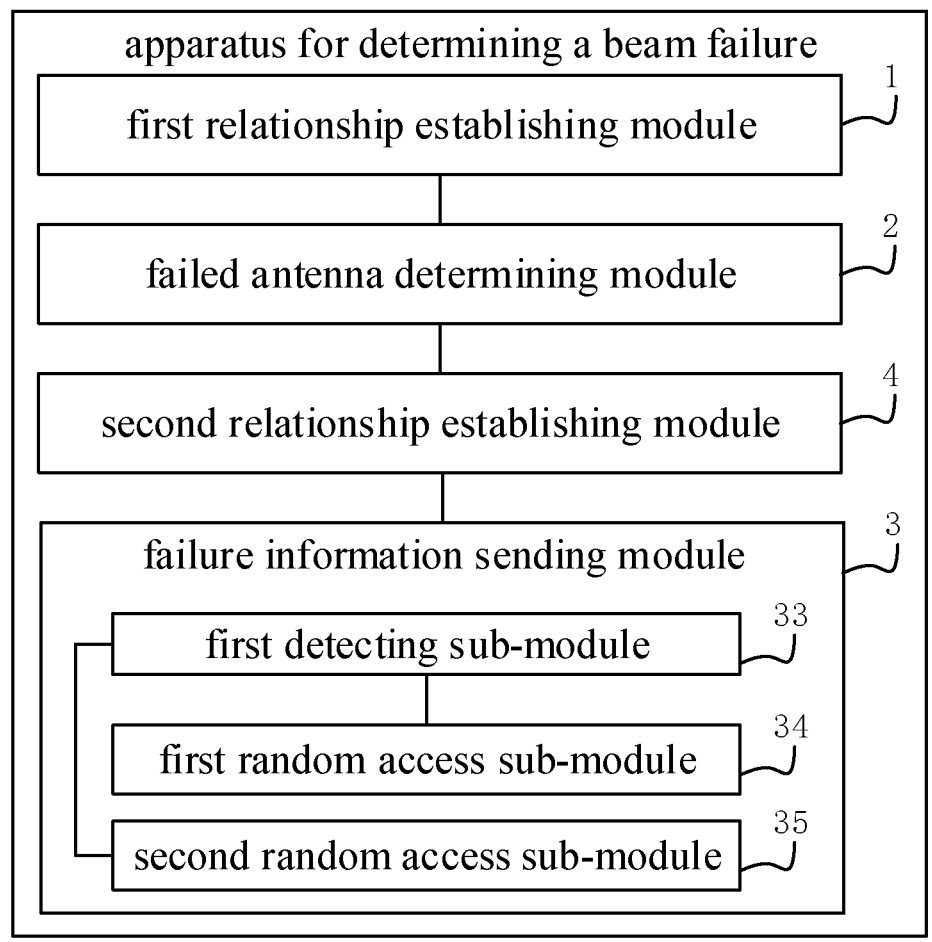
FIG. 20 is a block diagram of another apparatus for determining a beam failure according to an embodiment of the disclosure.

FIG. 20 is a block diagram of an apparatus for determining a beam failure according to an embodiment of the disclosure. As illustrated in FIG. 20, the failure information sending module 3 further includes a second random access sub-module 35, configured to initiate a random access to the base station on a random access time-frequency resource for a contention-based random access in response to determining that the available reference signal does not exit, in which a third message of the random access comprises the identification of the failed antenna panel.

Figure 21:
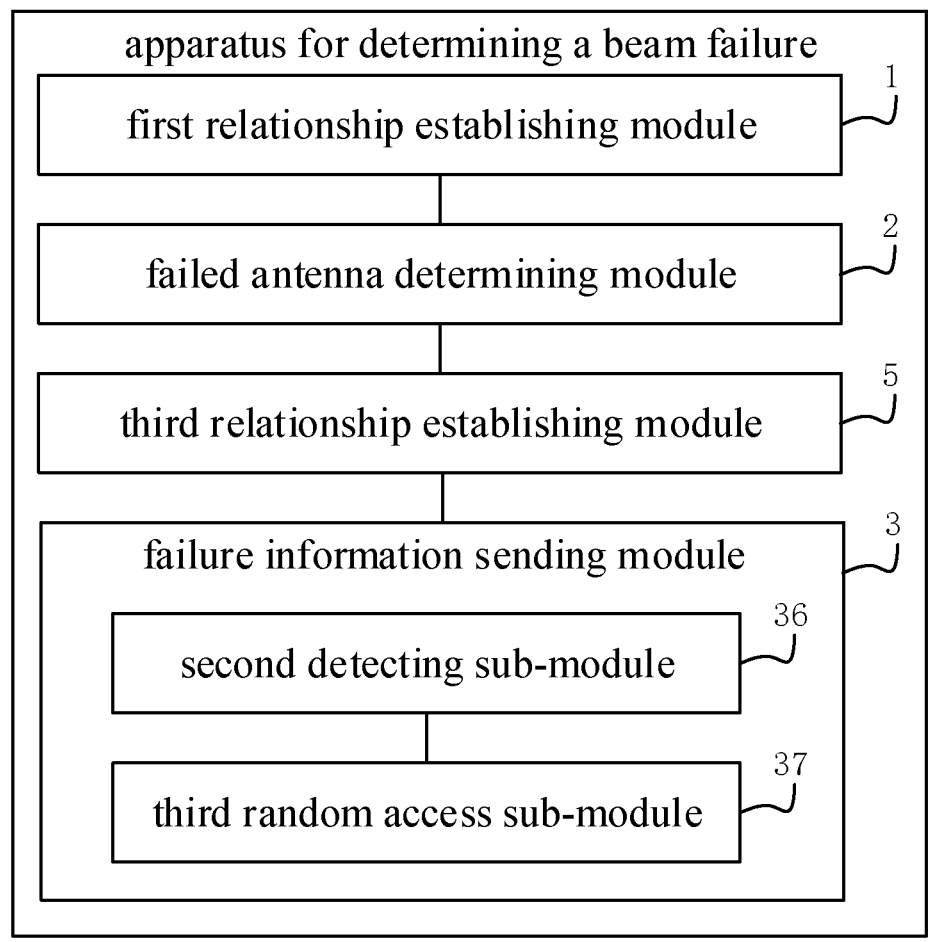
FIG. 21 is a block diagram of another apparatus for determining a beam failure according to an embodiment of the disclosure.

FIG. 21 is a block diagram of an apparatus for determining a beam failure according to an embodiment of the disclosure. As illustrated in FIG. 21, the apparatus further includes a third relationship establishing module 5.

The third relationship establishing module 5 is configured to establish an association relationship between reference signal sets of j candidate beams and j antenna panels based on received third configuration information, in which a reference signal set of a j-th candidate beam is associated with a j-th antenna panel, and different reference signals in the reference signal set of the j-th candidate beam correspond to different time-frequency resources and/or different random access preambles, where j≤n.

The failure information sending module 3 includes a second detecting sub-module 36 and a third random access sub-module 37.

The second detecting sub-module 36 is configured to detect all reference signals in a reference signal set of a candidate beam associated with the failed antenna panel to determine whether an available reference signal exits in the reference signal set of the candidate beam.

The third random access sub-module 37 is configured to send a random access preamble corresponding to the available reference signal to the base station on a time-frequency resource corresponding to the available reference signal in response to determining that the available reference signal exits.

Alternatively, the failure information sending module is configured to: send the beam failure information to the base station through the failed antenna panel and/or a failure-free antenna panel within the same serving cell as the failed antenna panel and in the n antennal panels.

Alternatively, the failure information sending module is configured to: send the beam failure information to the base station through the failed antenna panel and/or a failure-free antenna panel within a serving cell different from the failed antenna panel and in the n antennal panels, in which the beam failure information further comprises an identification of a serving cell to which the failed antenna panel belongs.

Alternatively, the serving cell comprises at least one of a primary cell; a primary secondary cell; a secondary cell.

Alternatively, the beam failure information is sent to the base station in a plurality of manners, and the failure information sending module is configured to: send the beam failure information to the base station in a first manner in response to determining that all the n antenna panels are failed antenna panels; and send the beam failure information to the base station in a second manner in response to determining that at least one antenna panel in the n antenna panels is not a failed antenna panel. A time delay from determining that the beam failure occurs in the failed antenna panel to enabling the base station to determine that the beam failure occurs in the failed antenna panel in the first manner is less than a time delay from determining that the beam failure occurs in the failed antenna panel to enabling the base station to determine that the beam failure occurs in the failed antenna panel in the second manner.

Alternatively, the beam failure information is sent to the base station in a plurality of manners, and the failure information sending module is configured to: send the beam failure information to the base station in a first manner in response to a usage priority of the failed antenna panel being higher than a preset priority; send the beam failure information to the base station in a second manner in response to the usage priority of the failed antenna panel being lower than the preset priority. A time delay from determining that the beam failure occurs in the failed antenna panel to enabling the base station to determine that the beam failure occurs in the failed antenna panel in the first manner is less than a time delay from determining that the beam failure occurs in the failed antenna panel to enabling the base station to determine that the beam failure occurs in the failed antenna panel in the second manner.

Figure 22:
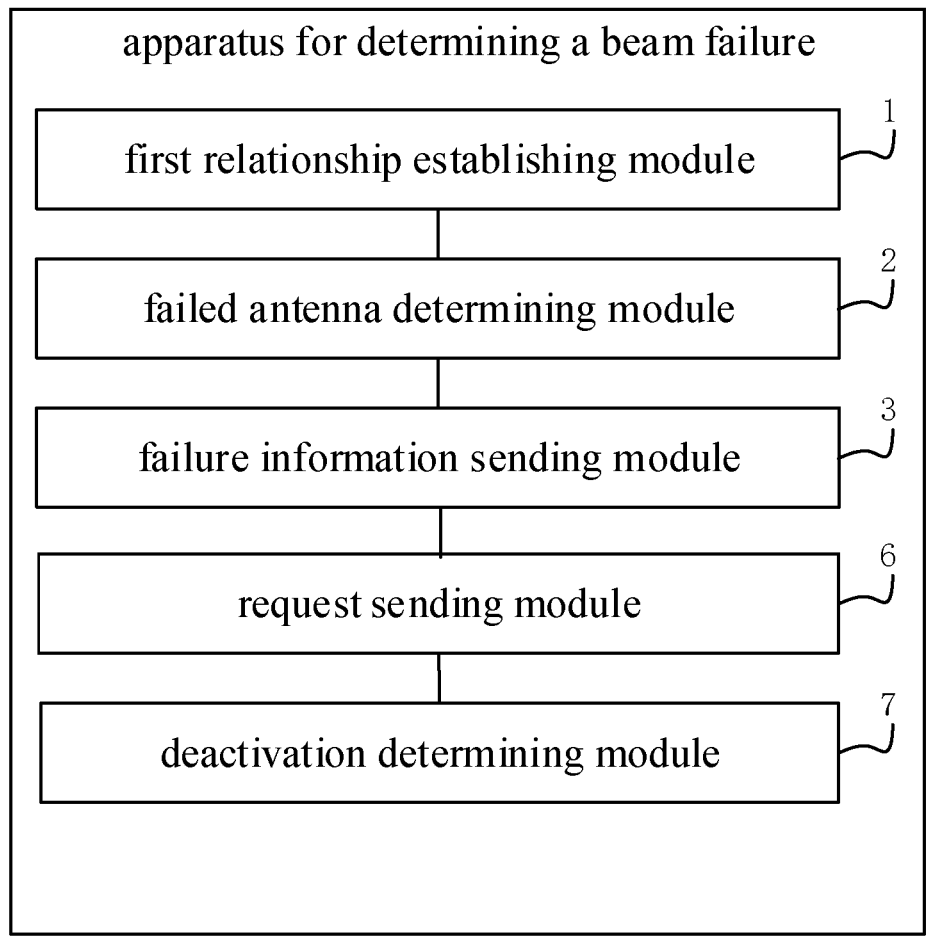
FIG. 22 is a block diagram of another apparatus for determining a beam failure according to an embodiment of the disclosure.

FIG. 22 is a block diagram of an apparatus for determining a beam failure according to an embodiment of the disclosure. As illustrated in FIG. 22, the apparatus further includes a request sending module 6 and a deactivation determining module 7.

The request sending module 6 is configured to send a closing request to the base station to request for deactivation of the failed antenna panel.

The deactivation determining module 7 is configured to determine whether to deactivate the failed antenna panel based on feedback information from the base station.

Figure 23:
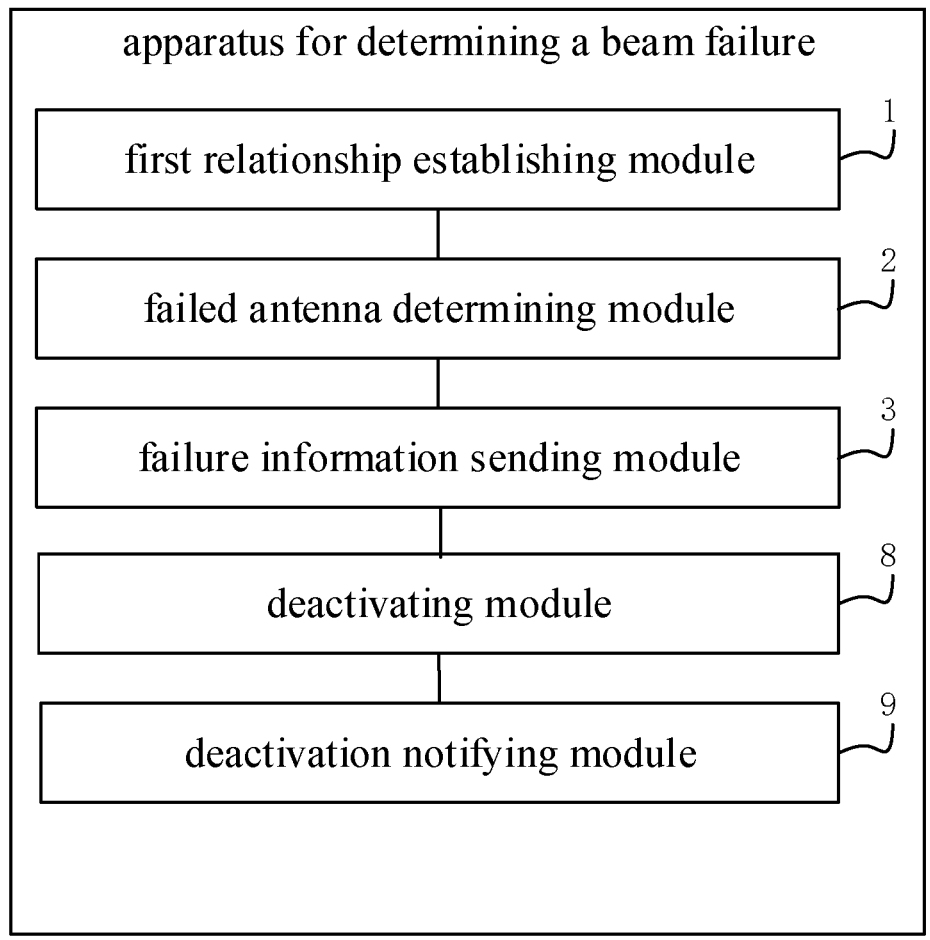
FIG. 23 is a block diagram of another apparatus for determining a beam failure according to an embodiment of the disclosure.

FIG. 23 is a block diagram of an apparatus for determining a beam failure according to an embodiment of the disclosure. As illustrated in FIG. 23, the apparatus further includes a deactivating module 8 and a deactivation notifying module 9.

The deactivating module 8 is configured to deactivate the failed antenna panel.

The deactivation notifying module 9 is configured to send a notification to the base station to notify the base station of deactivation of the failed antenna panel.

Regarding the apparatus in the foregoing embodiments, the specific manner in which each module performs operation has been described in detail in the embodiments of the method, and detailed description will not be given here.

Since the apparatus embodiments correspond to the method embodiments, the related parts not be described in the apparatus embodiments may refer to relative descriptions in the method embodiments. The above apparatus embodiments described herein are explanatory. The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure. The embodiments can be understood and implemented by persons of ordinary skill in the art without making creative efforts.

The embodiment of the disclosure further provides an electronic device.

The electronic device includes: a processor and a memory for storing instructions executable by the processor. The processor is configured to perform the method according to any of the above embodiments.

The embodiment of the disclosure further provides a computer-readable storage medium having computer programs stored thereon. When the computer programs are executed by a processor, the method according to any of the above embodiments is performed.

Figure 24:
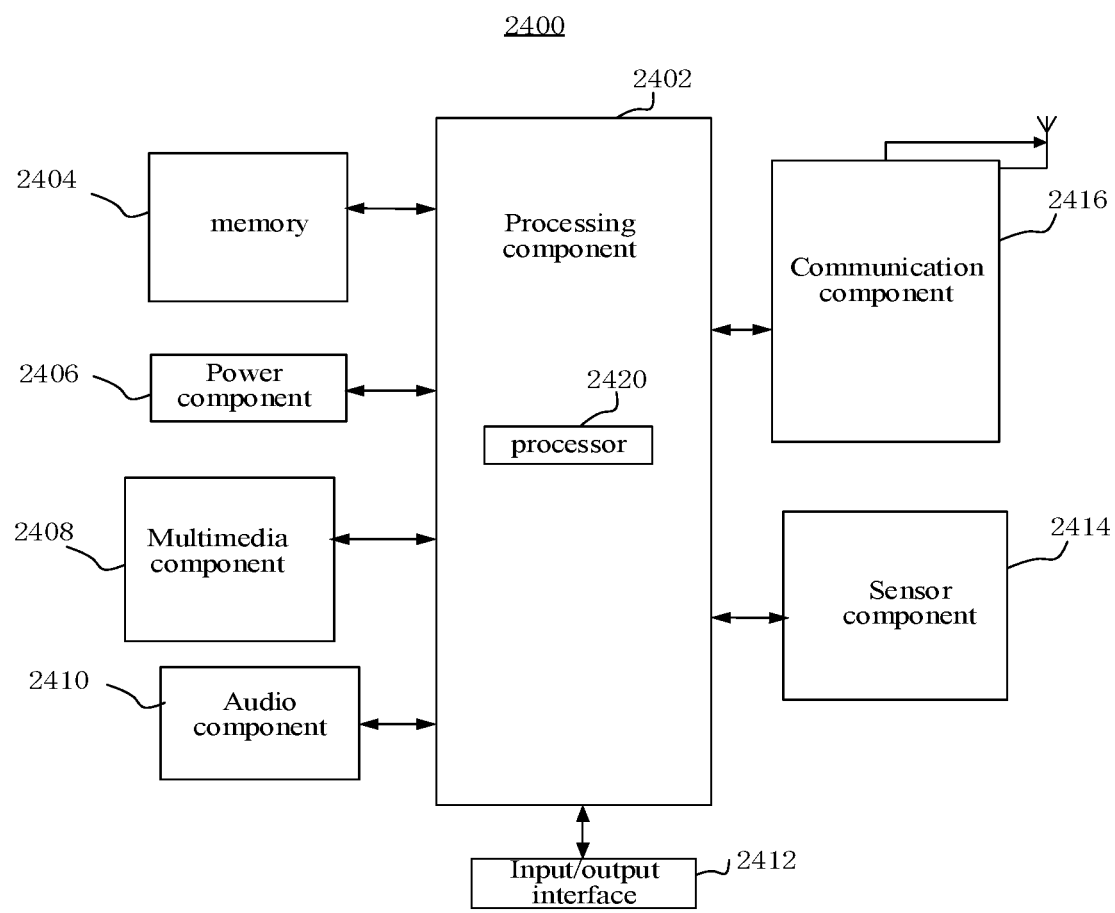
FIG. 24 is a block diagram of a device for determining a beam failure according to an embodiment of the disclosure.

FIG. 24 is a block diagram of a device 2400 for determining a beam failure according to an embodiment of the disclosure. The device 2400 may be a mobile phone, a computer, a digital broadcasting terminal, a message transceiver device, a game console, a tablet device, a medical device, a fitness device and a personal digital assistant.

As illustrated in FIG. 24, the device 2400 may include one or more of the following: a processing component 2402, a memory 2404, and a power supply component 2406, a multimedia component 2408, an audio component 2410, an input/output (I/O) interface 2412, a sensor component 2414, and a communication component 2416.

The processing component 2402 typically controls overall operations of the device 2400, such as the operations associated with display, telephone calls, data communications, camera operations, and recording operations. The processing component 2402 may include one or more processors 2420 to execute instructions to perform all or part of the steps in the above described method. Moreover, the processing component 2402 may include one or more modules which facilitate the interaction between the processing component 2402 and other components. For instance, the processing component 2402 may include a multimedia module to facilitate the interaction between the multimedia component 2408 and the processing component 2402.

The memory 2404 is configured to store various types of data to support the operation of the device 2400. Examples of such data include instructions for any applications or methods operated on the device 2400, contact data, phonebook data, messages, pictures, video, etc. The memory 2404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2406 provides power to various components of the device 2400. The power component 2406 may include a power management system, one or more power sources, and any other components associated with the generation, management, and distribution of power in the device 2400.

The multimedia component 2408 includes a screen providing an output interface between the device 2400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2408 includes a front-facing camera and/or a rear-facing camera. When the device 2400 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2410 is configured to output and/or input audio signals. For example, the audio component 2410 includes a microphone (MIC) configured to receive an external audio signal when the device 2400 is in an operation mode, such as a call mode, a recording mode, and a voice recognition mode. The received audio signal may be further stored in the memory 2404 or transmitted via the communication component 2416. In some embodiments, the audio component 2410 further includes a speaker to output audio signals.

The I/O interface 2412 provides an interface between the processing component 2402 and peripheral interface modules, such as a keyboard, a click wheel, buttons, and the like. The buttons may include, but are not limited to, a home button, a volume button, a starting button, and a locking button.

The sensor component 2414 includes one or more sensors to provide status assessments of various aspects of the device 2400. For instance, the sensor component 2414 may detect an open/closed status of the device 2400, relative positioning of components, e.g., the display and the keypad, of the device 2400, a change in position of the device 2400 or a component of the device 2400, a presence or absence of user contact with the device 2400, an orientation or an acceleration/deceleration of the device 2400, and a change in temperature of the device 2400. The sensor component 2414 may include a proximity sensor configured to detect the presence of nearby objects without any physical contact. The sensor component 2414 may also include a light sensor, such as a CMOS or CCD image sensor, for use in imaging applications. In some embodiments, the sensor component 2414 may also include an accelerometer sensor, a gyroscope sensor, a magnetic sensor, a pressure sensor, or a temperature sensor.

The communication component 2416 is configured to facilitate communication, wired or wirelessly, between the device 2400 and other devices. The device 2400 can access a wireless network based on a communication standard, such as WiFi, 2G, or 3G, or a combination thereof. In an exemplary embodiment, the communication component 2416 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 2400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 2404, executable by the processor 2420 in the device 2400, for performing the above method. For example, the non-transitory computer-readable storage medium may be a ROM, a RAM, a CD-ROM, a magnetic tape, a floppy disc, an optical data storage device, and the like.

According to the embodiments of the disclosure, the user device may establish the association relationship between the reference signal sets and the antenna panels based on the first configuration information, determine the failed antenna panel with a beam failure based on the reference signal set, and send the beam failure information to the base station to point out which antenna panel encounters the beam failure, such that the base station may accurately determine the failed antenna panel with the beam failure in the user device, thus facilitating schedule of resources.

Other embodiments of the present disclosure may be available to those skilled in the art upon consideration of the specification and practice of the present disclosure herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It should be understood that the present disclosure is not limited to the precise constructions described above and shown in the enclosed drawings, and various modifications and changes may be made without departing from the scope thereof. The scope of the present disclosure can be limited only by the appended claims.

In this document, relational terms, such as "first" and "second" and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. Further, unless expressly stated to the contrary, the phrase "comprising a/an . . . " and "comprises a/an . . . " specify the presence of defined elements but do not exclude the presence or addition of other same elements in such process, method, article, or apparatus.'

The method and apparatus provided by the embodiments of the present disclosure are described in detail. Specific embodiments are used to describe the principle and implementations of the disclosure. The forgoing description is used to generally understand the present disclosure and its core ideas. It will be appreciated by those skilled in the art that, modifications, equivalents, variants and improvements can be made on the specific implementations and application scopes based on the ideas of the present disclosure. Therefore, the present disclosure is not limited to the embodiments described in the specification.

What is claimed is:

1. A method for determining a beam failure, applied to a user device comprising n antenna panels, and the method comprising:
    establishing an association relationship between n reference signal sets and the n antenna panels based on received first configuration information, wherein an i-th reference signal set is associated with an i-th antenna panel, where i≤n;
    detecting all reference signals in at least one reference signal set of the n reference signal sets to determine whether a failed antenna panel with a beam failure exists in at least one antenna panel associated with the at least one reference signal set; and
    sending beam failure information indicating that a beam failure occurs in the failed antenna panel to a base station in response to determining that the failed antenna panel exists;
    wherein a media access control control element (MAC CE) signaling carrying an identification of the failed antenna panel is sent to the base station; and indication information is sent to the base station before the MAC CE signaling is sent to the base station, wherein the indication information is contained in a scheduling request, wherein the indication information is configured to indicate that the user device has an antenna panel, and the MAC CE signaling is sent to the base station based on a resource allocated by resource allocation information in response to receiving the resource allocation information sent by the base station based on the indication information.

2. The method of claim 1, wherein sending the beam failure information indicating that a beam failure occurs in the failed antenna panel to the base station comprises:
    sending a beam measurement report to the base station, wherein the beam measurement report comprises an identification of the failed antenna panel, an identification and signal quality information of each reference signal in a reference signal set associated with the failed antenna panel.

3. The method of claim 2, wherein sending the beam failure information indicating that a beam failure occurs in the failed antenna panel to the base station further comprises:
    sending indication information to the base station, wherein the indication information is contained in a scheduling request or the indication information is a preset random access preamble on a preset random access time-frequency resource, wherein the indication information is configured to indicate that the user device has an antenna panel;
    wherein sending the beam measurement report to the base station comprises:
    sending the beam measurement report to the base station based on a resource allocated by resource allocation information in response to receiving the resource allocation information sent by the base station based on the indication information.

4. The method of claim 1, wherein sending the beam failure information indicating that a beam failure occurs in the failed antenna panel to the base station comprises:
    sending a scheduling request to the base station, wherein the scheduling request comprises an identification of the failed antenna panel.

5. The method of claim 1, wherein sending the beam failure information indicating that a beam failure occurs in the failed antenna panel to the base station comprises:
    sending channel state information to the base station, wherein a bit at a first position in the channel state information has a first preset value and a bit at a second position in the channel state information has a second preset value, wherein the first preset value is configured to indicate an identification of the failed antenna panel and the second preset value is configured to indicate that a beam failure occurs.

6. The method of claim 5, wherein sending the beam failure information indicating that a beam failure occurs in the failed antenna panel to the base station further comprises:
    sending indication information to the base station, wherein the indication information is contained in a scheduling request or the indication information is a preset random access preamble on a preset random access time-frequency resource, wherein the indication information is configured to indicate that the user device has an antenna panel;
    wherein sending the channel state information to the base station comprises:
    sending the channel state information to the base station based on a resource allocated by resource allocation information in response to receiving the resource allocation information sent by the base station based on the indication information.

7. The method of claim 1, further comprising:
    establishing an association relationship between a reference signal set of at least one candidate beam and at least one antenna panel based on received second configuration information;
    wherein sending the beam failure information indicating that a beam failure occurs in the failed antenna panel to the base station comprises:
    detecting all reference signals in a reference signal set of a candidate beam associated with the failed antenna panel to determine whether an available reference signal exits in the reference signal set of the candidate beam; and
    initiating a random access to the base station on a time-frequency resource corresponding to the available reference signal in response to determining that the available reference signal exits, wherein a third message of the random access comprises an identification of the failed antenna panel.

8. The method of claim 7, wherein sending the beam failure information indicating that a beam failure occurs in the failed antenna panel to the base station further comprises:
    initiating a random access to the base station on a random access time-frequency resource for a contention-based random access in response to determining that the available reference signal does not exit, wherein a third message of the random access comprises the identification of the failed antenna panel.

9. The method of claim 1, further comprising:
establishing an association relationship between reference signal sets of j candidate beams and j antenna panels based on received third configuration information, wherein a reference signal set of a j-th candidate beam is associated with a j-th antenna panel, and the reference signal set of the j-th candidate beam satisfies at least one of the following conditions: different reference signals in the reference signal set of the j-th candidate beam correspond to different time-frequency resources and different reference signals in the reference signal set of the j-th candidate beam correspond to different random access preambles, where j≤n;
wherein sending the beam failure information indicating that a beam failure occurs in the failed antenna panel to the base station comprises:
detecting all reference signals in a reference signal set of a candidate beam associated with the failed antenna panel to determine whether an available reference signal exits in the reference signal set of the candidate beam; and
sending a random access preamble corresponding to the available reference signal to the base station on a time-frequency resource corresponding to the available reference signal in response to determining that the available reference signal exits.

10. The method of claim 1, wherein sending the beam failure information indicating that a beam failure occurs in the failed antenna panel to the base station comprises:
sending the beam failure information to the base station through at least one of the failed antenna panel and a failure-free antenna panel within a same serving cell as the failed antenna panel and in the n antennal panels.

11. The method of claim 1, wherein sending the beam failure information indicating that a beam failure occurs in the failed antenna panel to the base station comprises:
sending the beam failure information to the base station through at least one of the failed antenna panel and a failure-free antenna panel within a serving cell different from the failed antenna panel and in the n antennal panels, wherein the beam failure information further comprises an identification of a serving cell to which the failed antenna panel belongs.

12. The method of claim 10, wherein the serving cell comprises at least one of:
a primary cell;
a primary secondary cell;
a secondary cell.

13. The method of claim 1, wherein the beam failure information is sent to the base station in a plurality of manners, and sending the beam failure information indicating that a beam failure occurs in the failed antenna panel to the base station comprises:
sending the beam failure information to the base station in a first manner in response to determining that all the n antenna panels are failed antenna panels;
sending the beam failure information to the base station in a second manner in response to determining that at least one antenna panel in the n antenna panels is not a failed antenna panel;
wherein a time delay from determining that the beam failure occurs in the failed antenna panel to enabling the base station to determine that the beam failure occurs in the failed antenna panel in the first manner is less than a time delay from determining that the beam failure occurs in the failed antenna panel to enabling the base station to determine that the beam failure occurs in the failed antenna panel in the second manner.

14. The method of claim 1, wherein the beam failure information is sent to the base station in a plurality of manners, and sending the beam failure information indicating that a beam failure occurs in the failed antenna panel to the base station comprises:
sending the beam failure information to the base station in a first manner in response to a usage priority of the failed antenna panel being higher than a preset priority;
sending the beam failure information to the base station in a second manner in response to the usage priority of the failed antenna panel being lower than the preset priority;
wherein a time delay from determining that the beam failure occurs in the failed antenna panel to enabling the base station to determine that the beam failure occurs in the failed antenna panel in the first manner is less than a time delay from determining that the beam failure occurs in the failed antenna panel to enabling the base station to determine that the beam failure occurs in the failed antenna panel in the second manner.

15. The method of claim 1, further comprising:
sending a closing request to the base station to request for deactivation of the failed antenna panel; and
determining whether to deactivate the failed antenna panel based on feedback information from the base station.

16. The method of claim 1, further comprising:
deactivating the failed antenna panel; and
sending a notification to the base station to notify the base station of deactivation of the failed antenna panel.

17. An electronic device, comprising:
a processor;
a memory for storing instructions executable by the processor;
wherein, the processor is configured to perform a method for determining a beam failure, the method is applied to a user device and comprises:
establishing an association relationship between n reference signal sets and the n antenna panels based on received first configuration information, wherein an i-th reference signal set is associated with an i-th antenna panel, where i≤n;
detecting beams corresponding to all reference signals in at least one reference signal set of the n reference signal sets to determine whether a failed antenna panel with a beam failure exists in at least one antenna panel associated with the at least one reference signal set; and
sending beam failure information indicating that a beam failure occurs in the failed antenna panel to a base station in response to determining that the failed antenna panel exists;
wherein a media access control control element (MAC CE) signaling carrying an identification of the failed antenna panel is sent to the base station; and indication information is sent to the base station before the MAC CE signaling is sent to the base station, wherein the indication information is contained in a scheduling request, wherein the indication information is configured to indicate that the user device has an antenna panel, and the MAC CE signaling is sent to the base station based on a resource allocated by resource allocation information in response to receiving the resource allocation information sent by the base station based on the indication information.

18. A non-transitory computer-readable storage medium having computer programs stored thereon, wherein when the computer programs are executed by a processor, steps in a method for determining a beam failure are performed, the method is applied to a user device and comprises:
- establishing an association relationship between n reference signal sets and the n antenna panels based on received first configuration information, wherein an i-th reference signal set is associated with an i-th antenna panel, where $i \leq n$;
- detecting beams corresponding to all reference signals in at least one reference signal set of the n reference signal sets to determine whether a failed antenna panel with a beam failure exists in at least one antenna panel associated with the at least one reference signal set; and
- sending beam failure information indicating that a beam failure occurs in the failed antenna panel to a base station in response to determining that the failed antenna panel exists;
- wherein a media access control control element (MAC CE) signaling carrying an identification of the failed antenna panel is sent to the base station; and indication information is sent to the base station before the MAC CE signaling is sent to the base station, wherein the indication information is contained in a scheduling request, wherein the indication information is configured to indicate that the user device has an antenna panel, and the MAC CE signaling is sent to the base station based on a resource allocated by resource allocation information in response to receiving the resource allocation information sent by the base station based on the indication information.

\* \* \* \* \*